United States Patent
Bourd

(10) Patent No.: US 12,229,877 B2
(45) Date of Patent: Feb. 18, 2025

(54) GEOMETRY CULLING USING BOUNDING VOLUME HIERARCHY (BVH) FOR RAY TRACING

(71) Applicant: QUALCOMM Incorporated, San Diego, CA (US)

(72) Inventor: Alexei Vladimirovich Bourd, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 240 days.

(21) Appl. No.: 18/157,761

(22) Filed: Jan. 20, 2023

(65) Prior Publication Data

US 2024/0249466 A1 Jul. 25, 2024

(51) Int. Cl.
  G06T 15/30 (2011.01)
  G06T 17/00 (2006.01)
  G06T 17/10 (2006.01)

(52) U.S. Cl.
  CPC ............ G06T 15/30 (2013.01); G06T 17/005 (2013.01); G06T 17/10 (2013.01); *G06T 2210/12* (2013.01); *G06T 2210/21* (2013.01)

(58) Field of Classification Search
  CPC ........ G06T 15/30; G06T 17/005; G06T 17/10
  See application file for complete search history.

(56) References Cited

U.S. PATENT DOCUMENTS 10,991,147 B1 * 4/2021 Bakalash ................ G06T 15/06

FOREIGN PATENT DOCUMENTS

EP 3457362 A2 3/2019

OTHER PUBLICATIONS

Barczak J., "An Improved Multi-Level Raytracing Algorithm", Internet Citation, Jun. 19, 2009, 6 pages, 1, XP002758772, Sections 3.2-3.4, 4.1 figure 4.
International Search Report and Written Opinion—PCT/US2023/081205—ISA/EPO—May 2, 2024.

* cited by examiner

*Primary Examiner* — Grace Q Li
(74) *Attorney, Agent, or Firm* — QUALCOMM Incorporated

(57) ABSTRACT

Aspects presented herein relate to methods and devices for graphics processing including an apparatus, e.g., a GPU. The apparatus may obtain an indication of a BVH structure associated with a view frustum, where the BVH structure includes at least one first-level BVH including a plurality of first-level nodes and a plurality of second-level BVHs including a plurality of second-level nodes. The apparatus may also calculate whether the view frustum intersects with each first-level bounding box in the at least one first-level BVH. Further, the apparatus may calculate, for each first-level bounding box that the view frustum intersects, whether the view frustum intersects with each first-level child nod that is associated with each first-level bounding box. The apparatus may also output an indication of all of the first-level child nodes that the view frustum intersects for each of the set of first-level bounding boxes that the view frustum intersects.

29 Claims, 13 Drawing Sheets

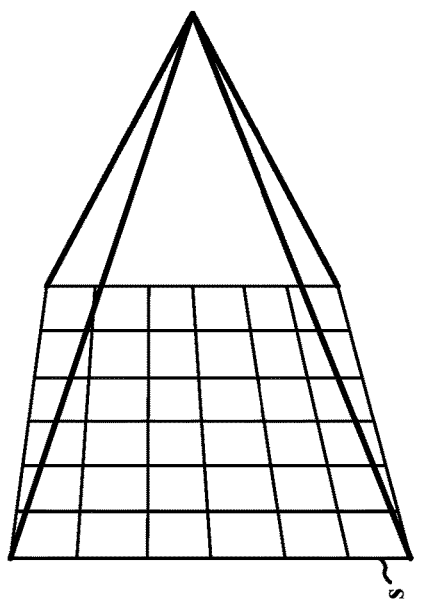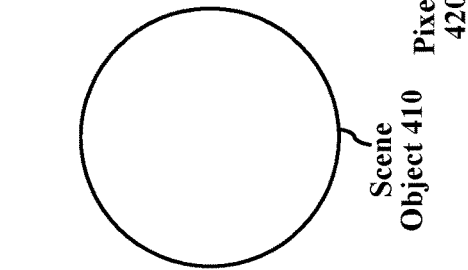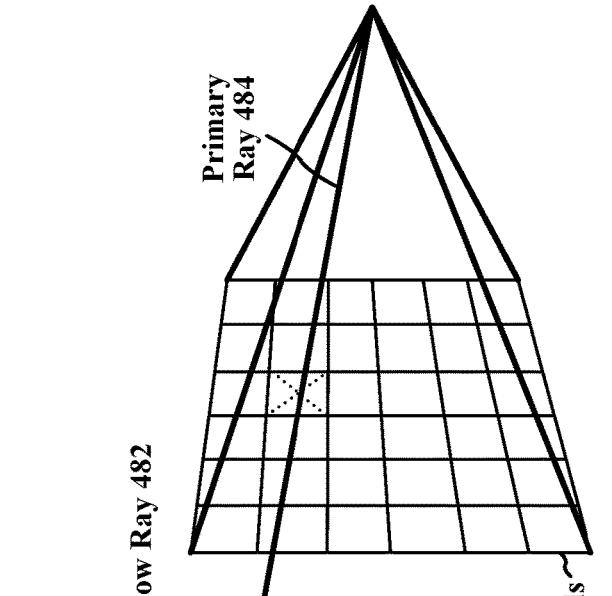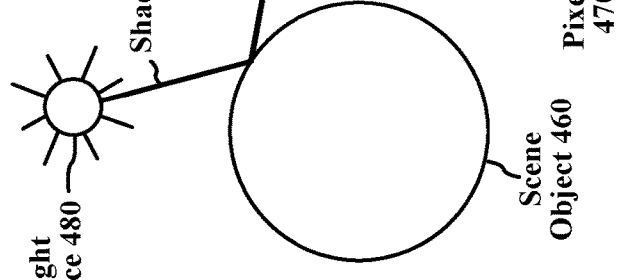
FIG. 4A
FIG. 4B

GEOMETRY CULLING USING BOUNDING VOLUME HIERARCHY (BVH) FOR RAY TRACING

TECHNICAL FIELD

The present disclosure relates generally to processing systems and, more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor.

Currently, there is a need for improved graphics processing. For instance, current node storage techniques in graphics processing may not efficiently store acceleration structures. Accordingly, there has developed an increased need for improved node storage techniques to efficiently store acceleration structures.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a graphics processing unit (GPU), a GPU, or any apparatus that may perform graphics processing. The apparatus may obtain an indication of a bounding volume hierarchy (BVH) structure including a plurality of nodes, where the BVH structure is associated with geometry data for a plurality of primitives in a scene, where each of the plurality of nodes is associated with one or more primitives of the plurality of primitives, where the BVH structure includes at least one first-level BVH including a plurality of first-level nodes and a plurality of second-level BVHs including a plurality of second-level nodes, where the at least one first-level BVH includes a set of first-level bounding boxes associated with the plurality of first-level nodes, where each of the plurality of second-level BVHs includes a set of second-level bounding boxes associated with the plurality of second-level nodes, and where the BVH structure is associated with a view frustum for a viewpoint of the scene. The apparatus may also calculate whether the view frustum intersects with each of the set of first-level bounding boxes in the at least one first-level BVH, where each of the set of first-level bounding boxes is associated with a set of first-level child nodes in the plurality of first-level nodes. Additionally, the apparatus may calculate, for each of the set of first-level bounding boxes that the view frustum intersects, whether the view frustum intersects with each of the set of first-level child nodes that is associated with each of the set of first-level bounding boxes, where each of the set of first-level child nodes is associated with at least one second-level bounding box in the set of second-level bounding boxes. The apparatus may also discard data for at least one of: (1) each of the set of first-level bounding boxes that the view frustum does not intersect, or (2) each of the set of first-level child nodes that the view frustum does not intersect. The apparatus may also store data associated with all of the set of first-level child nodes that the view frustum intersects for each of the set of first-level bounding boxes that the view frustum intersects based on the calculation of whether the view frustum intersects with each of the set of first-level child nodes. Moreover, the apparatus may output an indication of all of the set of first-level child nodes that the view frustum intersects for each of the set of first-level bounding boxes that the view frustum intersects. The apparatus may also render, based on a list of primitives for rendering, all of the plurality of primitives that are associated with all of the set of first-level child nodes that the view frustum intersects. The apparatus may also determine, for each of the set of first-level child nodes that the view frustum intersects, whether the view frustum intersects with the at least one second-level bounding box that is associated with the first-level child node. The apparatus may also store data for the at least one second-level bounding box that is associated with the first-level child node if the view frustum intersects with the at least one second-level bounding box. The apparatus may also output an indication of the at least one second-level bounding box if the view frustum intersects with the at least one second-level bounding box. The apparatus may also discard data for the at least one second-level bounding box that is associated with the first-level child node if the view frustum does not intersect with the at least one second-level bounding box.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 4A is a diagram illustrating an example rasterization process.

FIG. 4B is a diagram illustrating an example ray tracing process.

DETAILED DESCRIPTION

Figure 1:
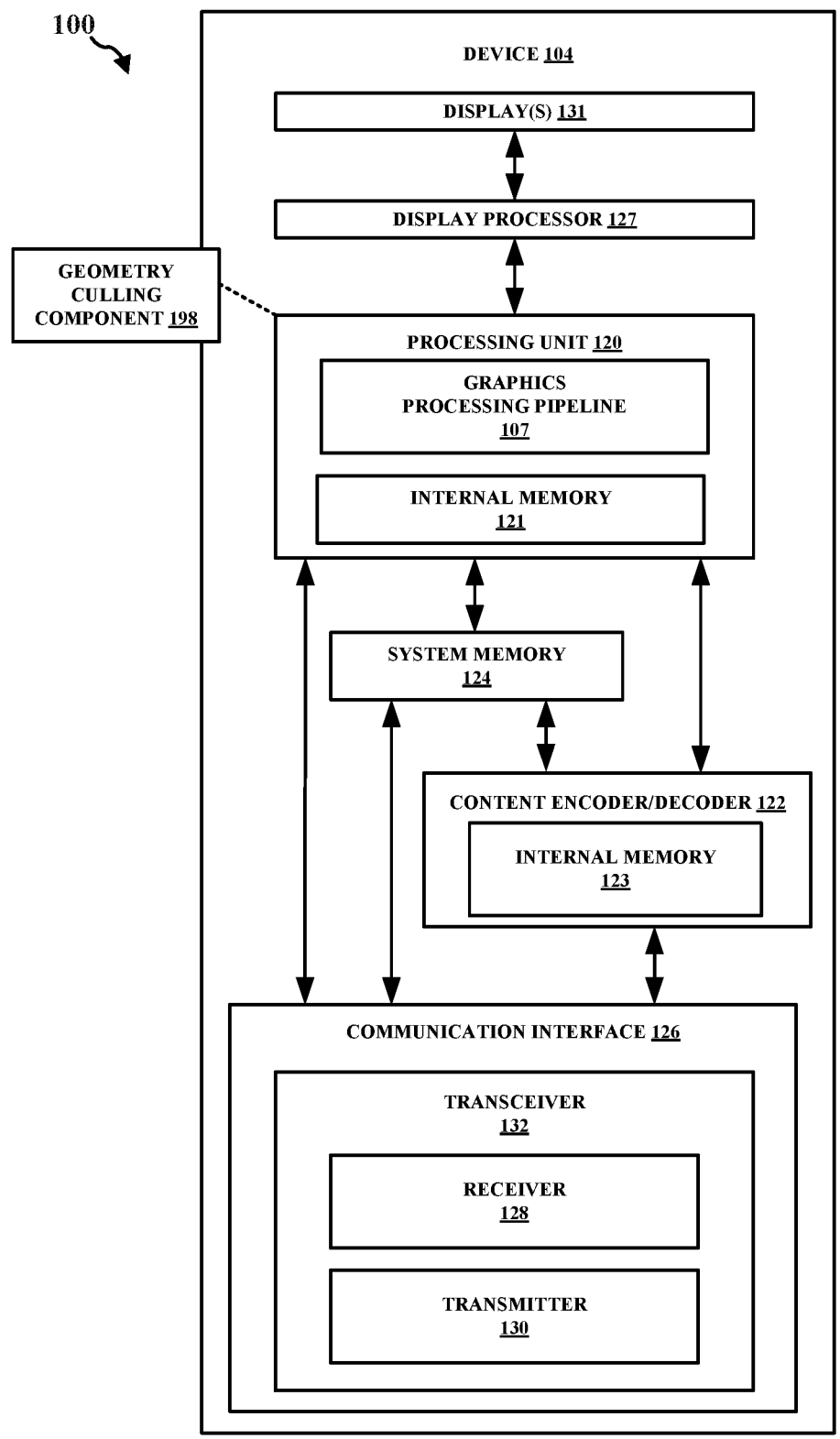
FIG. 1 is a block diagram that illustrates an example content generation system.

With the introduction of ray tracing capabilities into application program interfaces (APIs), hardware-accelerated ray tracing techniques may be utilized. For instance, application/game developers may utilize hardware-accelerated ray tracing techniques in real time three-dimensional (3D) graphics rendering. In some aspects, ray tracing may be used for limited purposes (e.g., shadows or global illumination), while other rendering steps may be performed using graphics and compute pipelines. This type of approach may be referred to as "hybrid ray tracing" as ray tracing is used for a portion of the graphics rendering. For instance, hybrid retracing may bundle ray tracing together with other graphics functions (e.g., rasterization or rendering). As indicated above, ray tracing may utilize construction of acceleration structures (e.g., bounding volume hierarchies (BVHs)) for the geometry (e.g., triangles and other primitives). A BVH may be time-consuming to build, and it may be time-consuming to re-arrange the geometry of the scene into a hierarchical format. In some instances, a BVH may significantly increase (e.g., double) the memory overhead of storing scenes in GPU memory. Accordingly, this building of BVH structures may not provide any direct value to graphics and compute pipelines. For instance, a GPU may spend a significant amount of time building the BVH structure, which is a downside of ray tracing. This construction step may have linear complexity with respect to the primitive count (e.g., millions to billions) which creates a significant overhead at the GPU. In some aspects, as constructing acceleration structures may provide no direct value to graphics and compute pipelines, the overhead of constructing a BVH structure may be attributed to the ray tracing process. Indeed, it may be time consuming and expensive to determine whether each node in a BVH structure is visible and may need to be rendered or rasterized. Aspects of the present disclosure may reduce the amount of nodes in a BVH structure (or corresponding primitives) that may need to be determined as visible in a scene or frame. Further, aspects presented herein may reduce the amount of primitives corresponding to nodes in a BVH structure that may need to be rendered or rasterized. In some instances, aspects presented herein may utilize a view frustum in the ray tracing process.

Aspects of the present disclosure may include a number of benefits or advantages. For instance, aspects presented herein may reduce the amount of nodes in a BVH structure that may need to be determined as visible in a scene or frame. Further, aspects presented herein may reduce the amount of primitives corresponding to nodes in a BVH structure that may need to be rendered or rasterized. In some instances, aspects presented herein may utilize a view frustum in the ray tracing process. For example, aspects presented herein (e.g., GPUs) may utilize a view frustum to reduce the amount of nodes in a BVH structure that may need to be determined as visible in a scene or frame. For instance, aspects presented herein (e.g., GPUs) may utilize a view frustum to determine whether a bounding box or node is visible in a scene. In some aspects, GPUs herein may determine whether a view frustum intersects with a set of bounding boxes (e.g., top-level bounding boxes) in a BVH (e.g., a top-level BVH). Based on this, aspects presented herein may reduce the amount of nodes that may need to be traversed in a BVH structure. By doing so, aspects presented herein may reduce the overall memory footprint of the storage process for BVHs.

Various aspects of systems, apparatuses, computer program products, and methods are described more fully hereinafter with reference to the accompanying drawings. This disclosure may however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

Aspects of graphics processing may store ray tracing data in different types of memory, e.g., a system memory. However, one potential issue for ray tracing performance is the amount of memory bandwidth available, as accessing data from memory (e.g., the system memory) may take a large amount of access cycles. In some instances, geometry data may be stored in an acceleration structure (e.g., a bounding volume hierarchy (BVH) structure). For each ray in a ray tracing process, the GPU may need to traverse from the root node (i.e., the top node in the tree structure) to the leaf nodes. The BVH structure may be associated with graphics processing scenes that include a number of primitives. Also, each of these primitives may correspond to one of the nodes in the BVH structure. In some aspects of graphics processing, loading these acceleration structures (e.g., BVH structures) into on-chip graphics memory at a GPU may help to achieve quicker access to data and eventually faster ray tracing performance. However, in some instances, the size of the acceleration structures (e.g., BVH structures) may be much larger than the size of the on-chip memory. In order to overcome this size differential, smaller acceleration structures may be loaded onto the on-chip memory in a fashion similar to top level acceleration structures. Also, some small bottom level acceleration structures (i.e., small in size compared to top level acceleration structures) may also be placed in the on-chip memory. However, due to the organization of the bottom level acceleration structures, it may be difficult to access these bottom level acceleration structures from the on-chip memory. As such, these bottom level acceleration structures may not be able to be accessed frequently enough to satisfy ray tracing performance specifications. Aspects of the present disclosure may optimize the storage of acceleration structures (e.g., BVH structures) associated with ray tracing processes. For instance, aspects of the present disclosure may store bottom level acceleration structures in certain types of memory such that these structures are easily accessible. In order to do so, aspects of the present disclosure may store bottom level BVH structures in an on-chip graphics memory (GMEM), as well as store the bottom level BVH structures in a system memory (SYSMEM). By doing so, aspects presented herein may more easily access the BVH structures from the on-chip graphics memory. In some instances, aspects of the present disclosure may store different levels of the bottom level BVH structures in both on-chip graphics memory and system memory.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a geometry culling component 198 configured to obtain an indication of a bounding volume hierarchy (BVH) structure including a plurality of nodes, where the BVH structure is associated with geometry data for a plurality of primitives in a scene, where each of the plurality of nodes is associated with one or more primitives of the plurality of primitives, where the BVH structure includes at least one first-level BVH including a plurality of first-level nodes and a plurality of second-level BVHs including a plurality of second-level nodes, where the at least one first-level BVH includes a set of first-level bounding boxes associated with the plurality of first-level nodes, where each of the plurality of second-level BVHs includes a set of second-level bounding boxes associated with the plurality of second-level nodes, and where the BVH structure is associated with a view frustum for a viewpoint of the scene. The geometry culling component 198 may also be configured to calculate whether the view frustum intersects with each of the set of first-level bounding boxes in the at least one first-level BVH, where each of the set of first-level bounding boxes is associated with a set of first-level child nodes in the plurality of first-level nodes. The geometry culling component 198 may also be configured to calculate, for each of the set of first-level bounding boxes that the view frustum intersects, whether the view frustum intersects with each of the set of first-level child nodes that is associated with each of the set of first-level bounding boxes, where each of the set of first-level child nodes is associated with at least one second-level bounding box in the set of second-level bounding boxes. The geometry culling component 198 may also be configured to discard data for at least one of: (1) each of the set of first-level bounding boxes that the view frustum does not intersect, or (2) each of the set of first-level child nodes that the view frustum does not intersect. The geometry culling component 198 may also be configured to store data associated with all of the set of first-level child nodes that the view frustum intersects for each of the set of first-level bounding boxes that the view frustum intersects based on the calculation of whether the view frustum intersects with each of the set of first-level child nodes. The geometry culling component 198 may also be configured to output an indication of all of the set of first-level child nodes that the view frustum intersects for each of the set of first-level bounding boxes that the view frustum intersects. The geometry culling component 198 may also be configured to render, based on a list of primitives for rendering, all of the plurality of primitives that are associated with all of the set of first-level child nodes that the view frustum intersects. The geometry culling component 198 may also be configured to determine, for each of the set of first-level child nodes that the view frustum intersects, whether the view frustum intersects with the at least one second-level bounding box that is associated with the first-level child node. The geometry culling component 198 may also be configured to store data for the at least one second-level bounding box that is associated with the first-level child node if the view frustum intersects with the at least one second-level bounding box. The geometry culling component 198 may also be configured to output an indication of the at least one second-level bounding box if the view frustum intersects with the at least one second-level bounding box. The geometry culling component 198 may also be configured to discard data for the at least one second-level bounding box that is associated with the first-level child node if the view frustum does not intersect with the at least one second-level bounding box. Although the following description may be focused on graphics processing, the concepts described herein may be applicable to other similar processing techniques.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, may be performed using other components (e.g., a CPU), consistent with disclosed embodiments.

GPUs may process multiple types of data or data packets in a GPU pipeline. For instance, in some aspects, a GPU may process two types of data or data packets, e.g., context register packets and draw call data. A context register packet may be a set of global state information, e.g., information regarding a global register, shading program, or constant data, which may regulate how a graphics context will be processed. For example, context register packets may include information regarding a color format. In some aspects of context register packets, there may be a bit that indicates which workload belongs to a context register. Also, there may be multiple functions or programming running at the same time and/or in parallel. For example, functions or programming may describe a certain operation, e.g., the color mode or color format. Accordingly, a context register may define multiple states of a GPU.

Context states may be utilized to determine how an individual processing unit functions, e.g., a vertex fetcher (VFD), a vertex shader (VS), a shader processor, or a geometry processor, and/or in what mode the processing unit functions. In order to do so, GPUs may use context registers and programming data. In some aspects, a GPU may generate a workload, e.g., a vertex or pixel workload, in the pipeline based on the context register definition of a mode or state. Certain processing units, e.g., a VFD, may use these states to determine certain functions, e.g., how a vertex is assembled. As these modes or states may change, GPUs may need to change the corresponding context. Additionally, the workload that corresponds to the mode or state may follow the changing mode or state.

Figure 2:
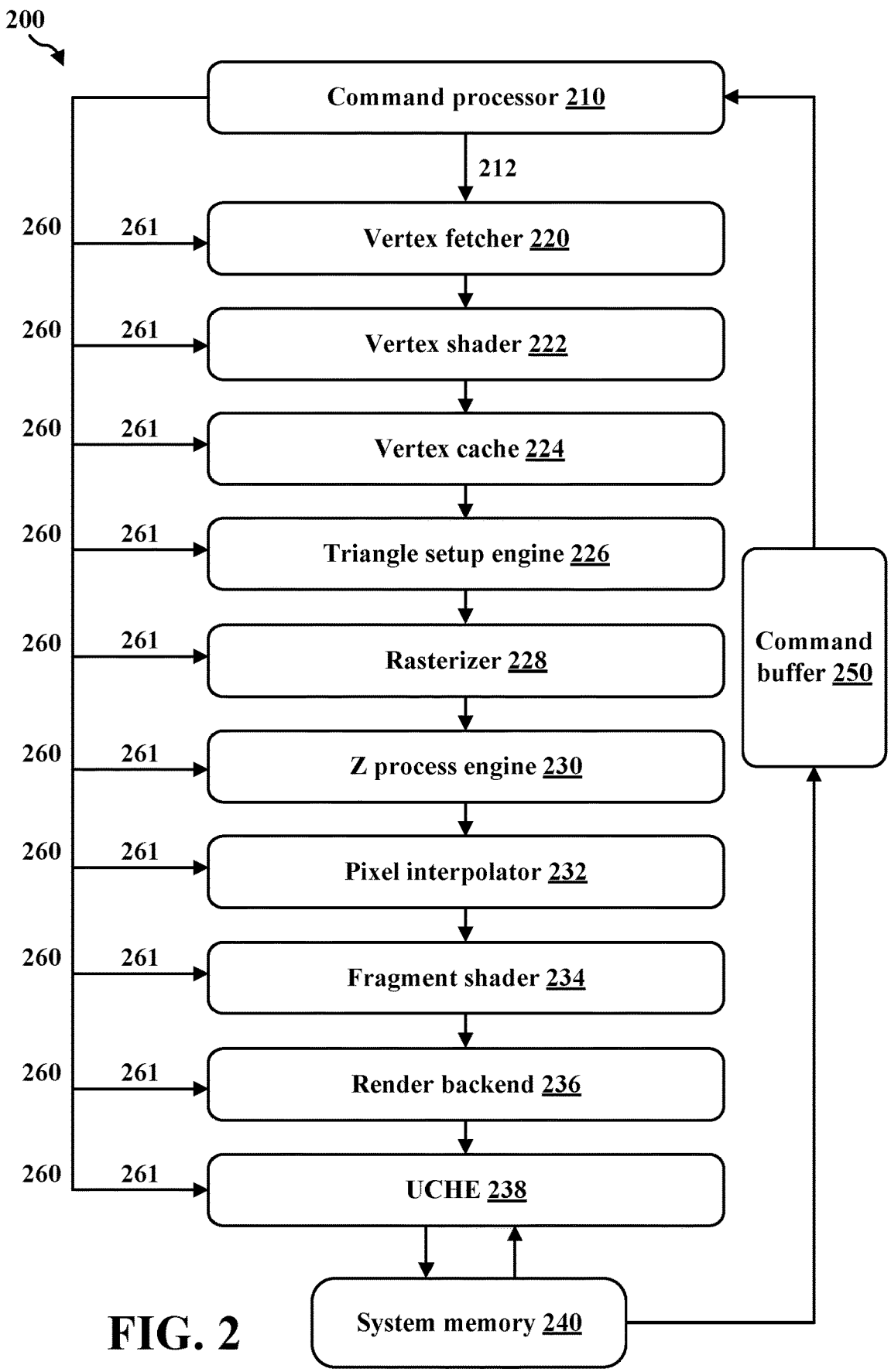
FIG. 2 is an example graphics processing unit (GPU).

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, level 2 (L2) cache (UCHE) 238, and system memory 240. Although FIG. 2 displays that GPU 200 includes processing units 220-238, GPU 200 may include a number of additional processing units. Additionally, processing units 220-238 are merely an example and any combination or order of processing units may be used by GPUs according to the present disclosure. GPU 200 also includes command buffer 250, context register packets 260, and context states 261.

As shown in FIG. 2, a GPU may utilize a CP, e.g., CP 210, or hardware accelerator to parse a command buffer into context register packets, e.g., context register packets 260, and/or draw call data packets, e.g., draw call packets 212. The CP 210 may then send the context register packets 260 or draw call packets 212 through separate paths to the processing units or blocks in the GPU. Further, the command buffer 250 may alternate different states of context registers and draw calls. For example, a command buffer may be structured in the following manner: context register of context N, draw call(s) of context N, context register of context N+1, and draw call(s) of context N+1.

GPUs may render images in a variety of different ways. In some instances, GPUs may render an image using rendering and/or tiled rendering. In tiled rendering GPUs, an image may be divided or separated into different sections or tiles. After the division of the image, each section or tile may be rendered separately. Tiled rendering GPUs may divide computer graphics images into a grid format, such that each portion of the grid, i.e., a tile, is separately rendered. In some aspects, during a binning pass, an image may be divided into different bins or tiles. In some aspects, during the binning pass, a visibility stream may be constructed where visible primitives or draw calls may be identified. In contrast to tiled rendering, direct rendering does not divide the frame into smaller bins or tiles. Rather, in direct rendering, the entire frame is rendered at a single time. Additionally, some types of GPUs may allow for both tiled rendering and direct rendering.

Some aspects of graphics processing may utilize different types of rendering techniques, such as ray tracing. Ray tracing is a rendering technique for generating an image by tracing a path of light for the pixels in an image plane and simulating the effects of its encounters with the objects in the scene. By doing so, ray tracing can produce incredibly realistic lighting effects. Ray tracing has a number of benefits including: providing more realistic effects (e.g., reflections), improved global illumination, improved glossy effects, improved depth of field, etc. Ray tracing may also help to generate different types of improved shadows, such as hard shadows and/or soft shadows. Some of the effects of ray tracing may include indirect illumination and the ability to depict caustics (i.e., the patterns of light and color that occur when light rays are reflected or refracted from a surface). As a result, ray tracing may result in the generation of photo realistic images. Ray tracing may be utilized by a number of different processors within graphics processing or data processing, such as a graphics processing unit (GPU) or a central processing unit (CPU).

Figure 3:
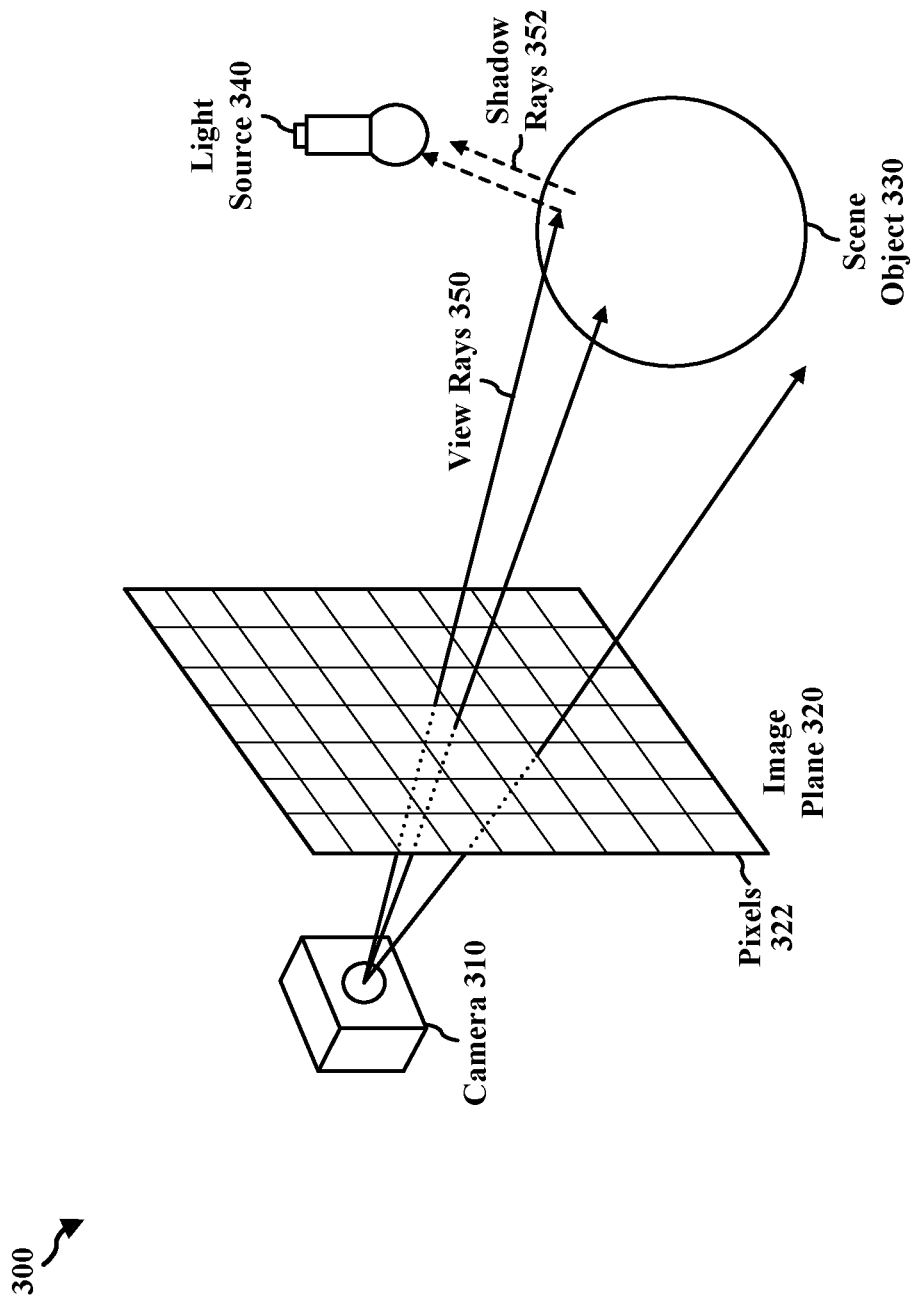
FIG. 3 is a diagram illustrating an example ray tracing process.

FIG. 3 illustrates diagram 300 including one example of a ray tracing process. As shown in FIG. 3, diagram 300 includes camera 310, image plane 320 including pixels 322, scene object 330, light source 340, view rays 350, and shadow rays 352. FIG. 3 shows that view rays 350 are traced from camera 310 and through image plane 320. After passing image plane 320, the view rays 350 are traced to scene object 330. At least some of the view rays 350 are traced off of scene object 330 and are traced towards light source 340 as shadow rays 352. Accordingly, the shadow rays 352 and view rays 350 may trace the light from light source 340. FIG. 3 depicts how ray tracing may generate an image by tracing the path of light (e.g., from light source 340) for the pixels in an image plane (e.g., pixels 322 in image plane 320).

Ray tracing is distinguishable from a number of other rendering techniques utilized in graphics processing, such as rasterization. In the process of rasterization, for each pixel in each primitive in a scene, the pixel may be shaded if a portion of the pixel is covered by the primitive. In contrast, in the process of ray tracing, for each pixel corresponding to a primitive in a scene, a ray is generated. If the generated ray is determined to hit or strike a certain primitive, then the pixel is shaded. In some instances of graphics processing, ray tracing algorithms may be performed alongside rasterization, such as via a hybrid ray tracing/rasterization model.

FIGS. 4A and 4B illustrate diagram 400 and diagram 450 including an example process of rasterization and an example process of ray tracing, respectively. As shown in FIG. 4A, diagram 400 includes scene object 410 and pixels 420. FIG. 4A depicts that the process of rasterization determines, for each of pixels 420 in a scene including scene object 410, a pixel is shaded if a portion of the pixel is covered by a primitive. As shown in FIG. 4B, diagram 450 includes scene object 460, pixels 470, light source 480, shadow ray 482, and primary ray 484. FIG. 4B depicts that the process of ray tracing determines if a generated ray (e.g., shadow ray 482) will hit or strike a certain primitive in scene object 460 corresponding to one of the pixels 470 via primary ray 484, then the pixel is shaded.

As indicated herein, the process of ray tracing may be performed by determining whether a ray will hit/strike any primitive(s) in a scene. For example, ray tracing algorithms may perform a simple query operation: Is a given ray going to hit/strike any primitive(s) in a scene? The process of ray tracing is computationally intensive, as a large amount of rays may be traced against a large number of primitives/triangles, which may utilize a large number of ray-triangle intersection tests. For example, in one ray tracing procedure, approximately 1 million rays may be traced against approximately 1 million primitives/triangles, which may utilize approximately 1 trillion ray-triangle intersection tests. In some aspects of ray tracing procedures, an origin point for a given ray may be represented by O(ray). Further, there may be a number of values calculated for the ray, such as a free variable in a ray parametrization (e.g., a minimum time $t_{min}$ strike primitives in a scene ($t_{min}$) or a maximum time to strike primitives in a scene ($t_{max}$)) and a calculated distance to strike primitives in the scene. In some aspects, t=0 may correspond to a ray origin. Additionally, using the values of $t_{min}$ and $t_{max}$ may be useful for some purposes of a rendering algorithm. For example, when computing diffuse lighting effects such as ambient occlusion, limiting a value of $t_{max}$ may help to avoid hitting objects that are too far from a ray origin.

Figure 5:
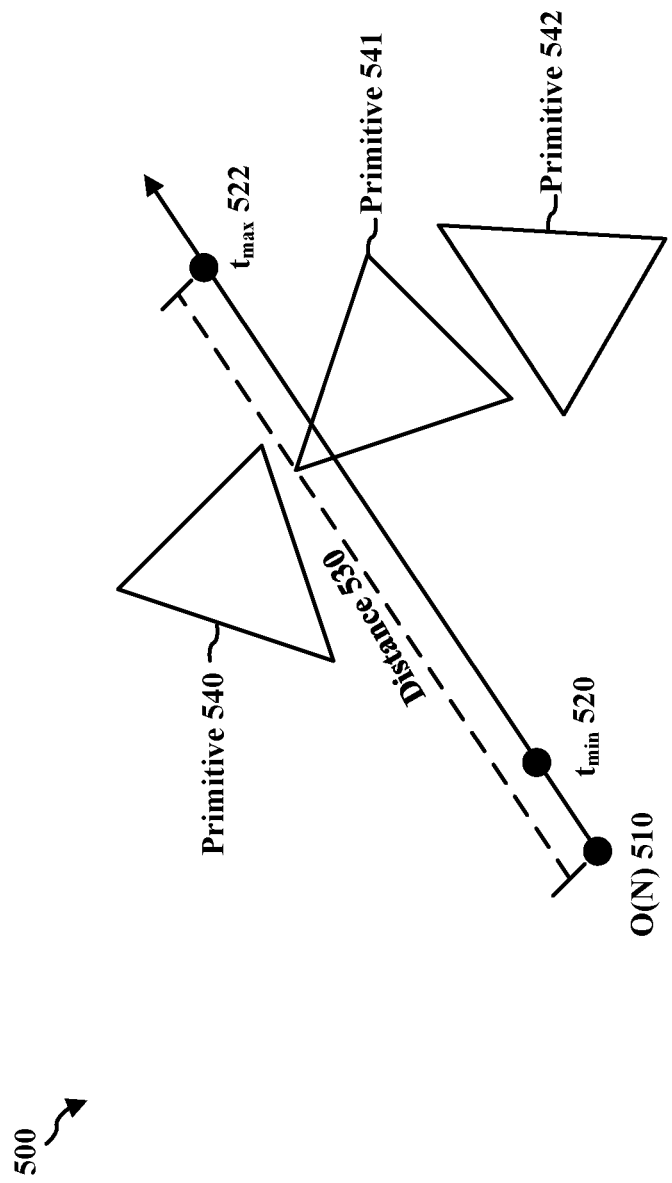
FIG. 5 is a diagram illustrating an example ray tracing process.

FIG. 5 illustrates diagram 500 including one example of a ray tracing process. As shown in FIG. 5, diagram 500 includes origin point for a ray (O(ray) 510), a minimum time to strike primitives in a scene ($t_{min}$ 520), a maximum time to strike primitives in a scene ($t_{max}$ 522), a calculated distance to strike primitives in the scene (distance 530), and a number of primitives (primitive 540, primitive 541, and primitive 542) in the scene. FIG. 5 shows that ray tracing techniques may utilize a number of values to determine if a ray is going to hit a primitive. For instance, to determine if a ray will strike a primitive, ray tracing techniques may utilize a ray direction, an origin point for a ray (O(ray) 510), a minimum time to strike primitives ($t_{min}$ 520), a maximum time to strike primitives ($t_{max}$ 522), a calculated distance to strike primitives (distance 530), and a number of primitives (primitive 540, primitive 541, and primitive 542).

Ray tracing may utilize various data structures for accelerating a computational process, such as a bounding volume hierarchy (BVH). In a bounding volume hierarchy, primitives are held in leaf nodes. Further, internal nodes may hold access aligned bounding boxes (AABBs) that enclose certain leaf node geometry. Data structures for ray tracing may also utilize a ray-box intersection for internal nodes and/or a ray-triangle test for leaf nodes. These types of data structures may reduce the computational complexity O(N) of the ray tracing process (e.g., reduce the computational complexity O(N) by log(N)), where N is a number of primitives. For instance, using a BVH may allow a replacement of O(N) with O(log(N)) (e.g., for one ray).

Figure 6B:
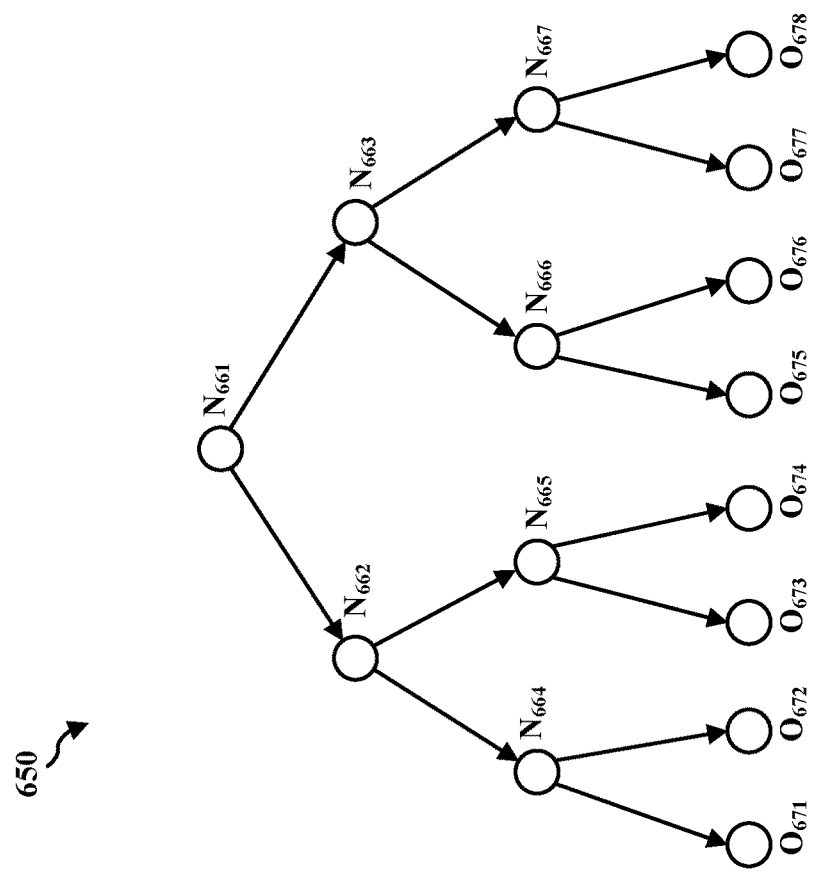
FIG. 6B is a diagram illustrating an example data structure.
Figure 6A:
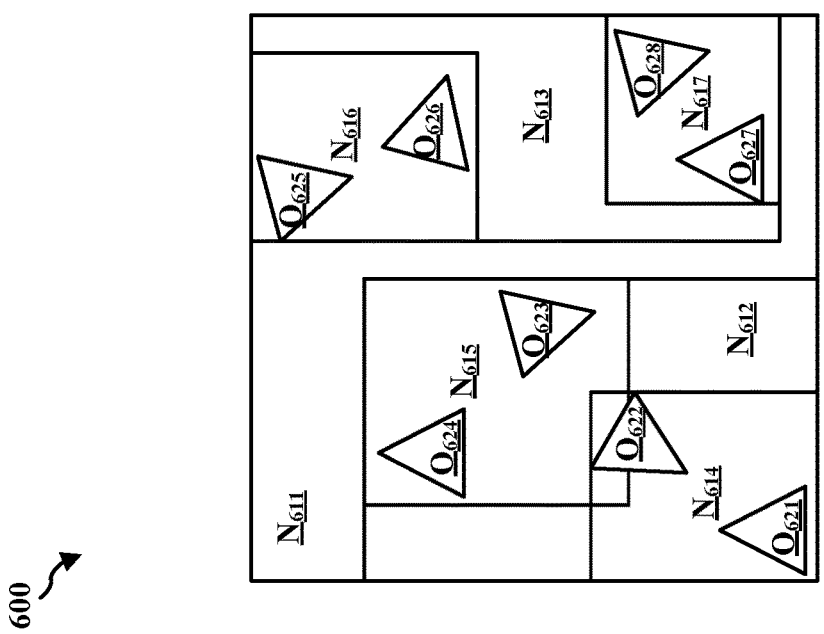
FIG. 6A is a diagram illustrating an example data structure.

FIGS. 6A and 6B illustrate diagram 600 and diagram 650, respectively, including example data structure techniques utilized in ray tracing. As shown in FIG. 6A, diagram 600 includes a number of nodes (internal nodes $N_{611}$-$N_{617}$) and a number of primitives (primitives $O_{621}$-$O_{628}$). FIG. 6A depicts a ray-box intersection for internal nodes $N_{611}$-$N_{617}$ and primitives $O_{621}$-$O_{628}$. As shown in FIG. 6B, diagram 650 includes a number of nodes (leaf nodes $N_{661}$-$N_{667}$) and a number of primitives (primitives $O_{671}$-$O_{678}$). FIG. 6B depicts a ray-triangle test for leaf nodes $N_{661}$-$N_{667}$ and primitives $O_{671}$-$O_{678}$. Both of the data structure techniques in FIGS. 6A and 6B, e.g., the ray-box intersection and the ray-triangle test, aim to reduce the computational complexity in ray tracing.

As indicated herein, there are a number of different stages during a ray tracing process. For example, the stages of ray tracing may include: bounding volume hierarchy construction and refinement, ray generation, bounding volume hierarchy traversal, ray-triangle intersection, and ray-box intersection. There may also be different steps during bounding volume hierarchy construction, including partitioning triangles into multiple groups, forming a bounding box around each group, and recursively partitioning each group. Additionally, there may be several ways to partition during bounding volume hierarchy construction, which may result in a certain number of possible solutions, e.g., $2^{n \log n}$ solutions. As a result, these improved solutions may yield improved ray tracing performance.

Aspects of ray tracing may also utilize a number of bounding volume hierarchy algorithms, such as split bounding volume hierarchy (SBVH) and linear bounding volume hierarchy (LBVH). In some instances, SBVH may result in slower build times and better quality compared to LBVH. Likewise, LBVH may result in faster build times and poorer quality compared to SBVH. Additionally, some aspects of ray tracing may utilize bounding volume hierarchy refinement. In bounding volume hierarchy refinement, given a binary BVH with one triangle per leaf, ray tracing techniques may permute the tree topology. Bounding volume hierarchy refinement may utilize different algorithms, e.g., a treelet restructuring BVH (TRBVH) and a parallel reinsertion BVH (PRBVH). Some aspects of ray tracing may also utilize BVH widening, which may convert a binary tree (i.e., an initial BVH) to a wide BVH that is wider than the binary tree or initial BVH. For example, hierarchy in the initial BVH may include three levels, where the primitives are included in a third level of the hierarchy. The hierarchy in the wide BVH may include two levels, where the primitives are included in a second level of the hierarchy. In some instances of BVH widening, the wide BVH may include an internal node with a certain amount of AABBs (e.g., up to eight AABBs) and a leaf node with a certain amount of primitives/triangles (e.g., up to four primitives/triangles).

Figures 7A, 7B:
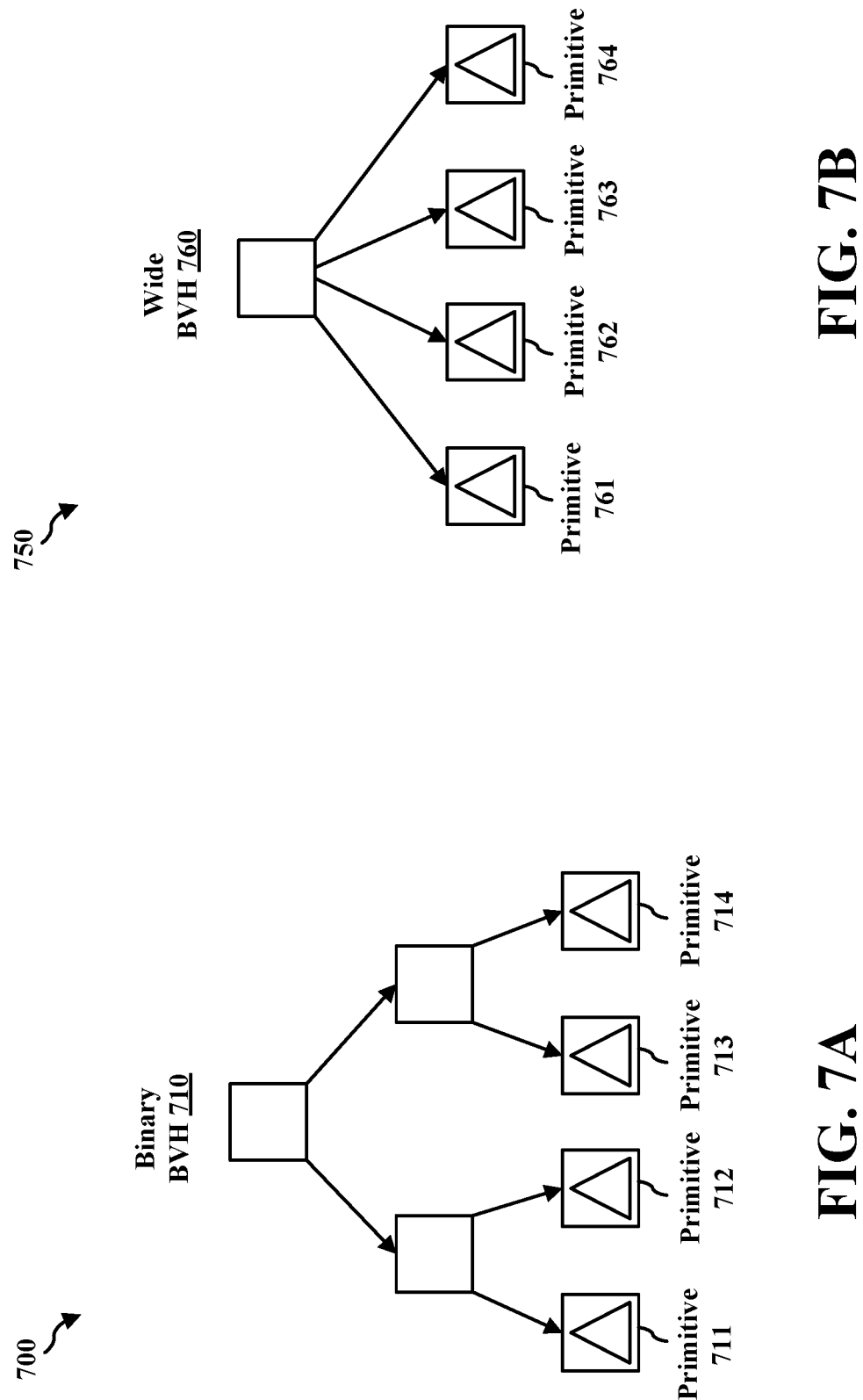
FIG. 7A is a diagram illustrating an example of a bounding volume hierarchy (BVH).
FIG. 7B is a diagram illustrating another example of a BVH.

FIGS. 7A and 7B illustrate diagram 700 and diagram 750 including a binary bounding volume hierarchy and a wide bounding volume hierarchy, respectively. As shown in FIG. 7A, diagram 700 includes a binary bounding volume hierarchy 710 including primitive 711, primitive 712, primitive 713, and primitive 714. FIG. 7A depicts that binary bounding volume hierarchy 710 includes a tree with a depth value of three, where primitives 711-714 are in the third depth of the hierarchy. As shown in FIG. 7B, diagram 750 includes a wide bounding volume hierarchy 760 including primitive 761, primitive 762, primitive 763, and primitive 764. FIG. 7B depicts that wide bounding volume hierarchy 760 includes a tree with a depth value of two, where primitives 761-764 are in the second depth of the hierarchy. As shown in FIGS. 7A and 7B, binary bounding volume hierarchy 710 may undergo a process of bounding volume hierarchy widening that results in wide bounding volume hierarchy 760.

Some aspects of ray tracing may utilize bounding volume hierarchy compression. For instance, ray tracing techniques may compress wide nodes to fit a fixed size (e.g., 64 bytes). The BVH compression may include an internal node compression that compresses an amount of AABBs (e.g., eight AABBs) and/or a first child index. The BVH compression may also include a leaf node compression that compresses a certain amount of primitives/triangles (e.g., up to four primitives/triangles) and the corresponding indices. Also, ray tracing techniques may utilize bounding volume hierarchy traversal, such as breadth first search traversal and/or depth first search traversal of a wide BVH. Some aspects of ray tracing generation may utilize an operation where rays are generated on-the-fly. For instance, a number a different types of rays may be generated such as primary rays, shadow rays, and/or secondary rays.

Additionally, there may be a number of different ray tracing stages utilized in hardware or software, e.g., GPU/ CPU hardware or software. For instance, in certain stages, a driver may construct the BVH on a CPU or GPU (e.g., a BVH construction stage and a BVH node compression stage). In a BVH traversal stage, the BVH traversal may occur in the shader at the GPU. Also, certain stages may be implemented in the GPU hardware (e.g., a BVH node decompression stage, a ray-bounding box intersection stage, and a ray-triangle intersection stage).

Some aspects of graphics processing (e.g., ray tracing) may utilize a view frustum (also referred to as a viewing frustum). A view frustum is a region within a modeled world in graphics processing that may appear on a display or screen (e.g., the field of view of a viewpoint or perspective virtual camera system). The view frustum may be obtained by taking a frustum (i.e., a truncation with parallel planes) of a pyramid of vision from the viewpoint or camera, which is an adaptation of a cone of vision for a viewpoint or camera. The shape of the view frustum region may vary depending on what kind of camera is being simulated, but it may be a frustum of a rectangular pyramid. The planes that cut the view frustum that are perpendicular to the viewing direction may be referred to as a near plane and a far plane. Objects may be drawn or rendered if they are within the space between the near plane and the far plane (i.e., farther away from the viewpoint/camera than the near plane and closer to the viewpoint/camera than the far plane). Likewise, objects may not be drawn or rendered if they are closer to the viewpoint/camera than the near plane or farther away from the viewpoint/camera than the far plane. In some aspects, the far plane may be infinitely far away from the viewpoint/ camera, such that all objects within the view frustum are drawn/rendered regardless of their respective distance from the viewpoint/camera. Additionally, view frustum culling may be the process of removing from the rendering process those objects that are outside of the viewing frustum. Rendering these objects may be a waste of resources, as they are not directly visible from the perspective of the viewpoint/ camera. Further, to increase the speed of the culling process, culling may be performed using bounding volumes surrounding the objects, rather than the objects themselves.

Figure 8:
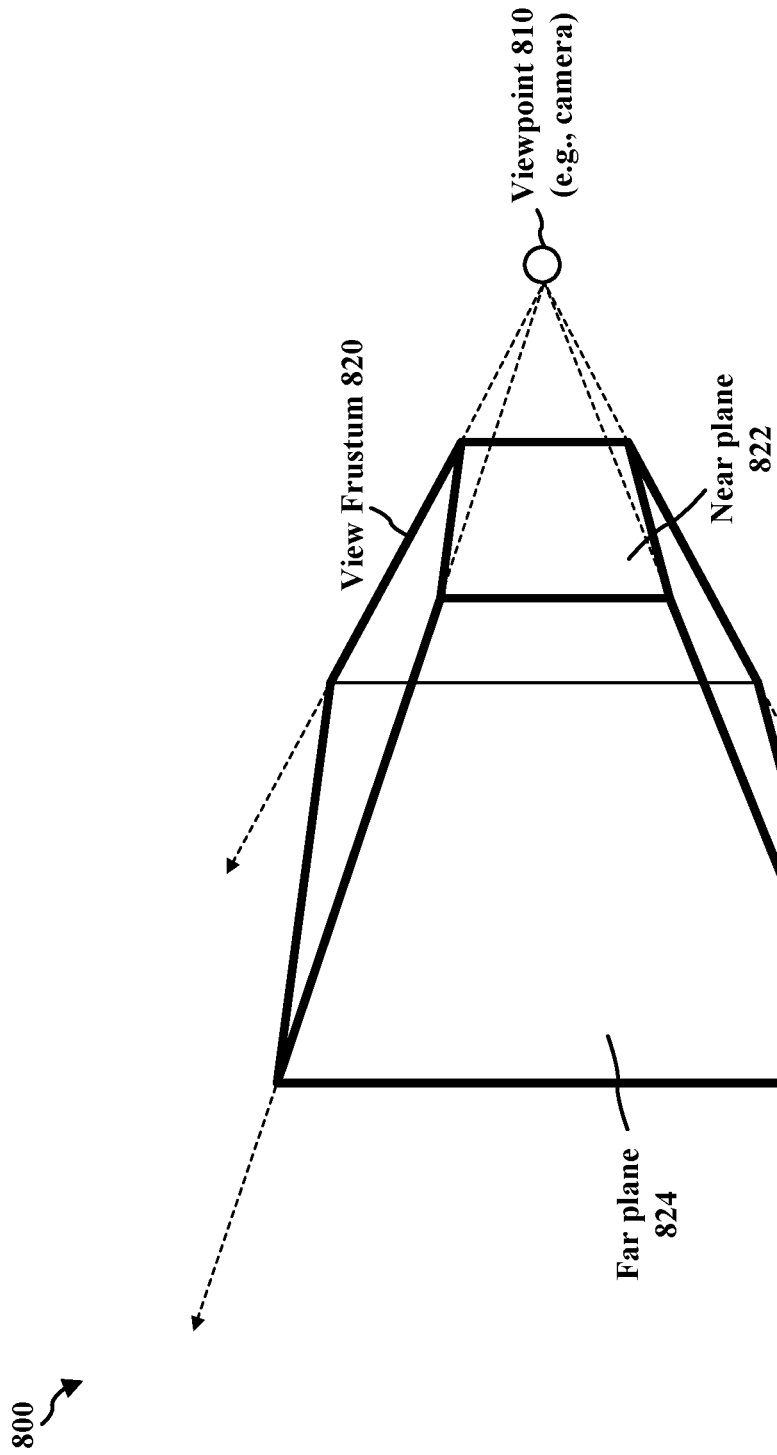
FIG. 8 is a diagram illustrating an example of a view frustum.

FIG. 8 illustrates diagram 800 including one example of a view frustum. More specifically, diagram 800 includes a view frustum 820 and a corresponding viewpoint or camera. As shown in FIG. 8, diagram 800 includes viewpoint 810 (e.g., a camera), and view frustum 820 including near plane 822 and far plane 824. As depicted in FIG. 8, the planes that cut the view frustum 820 that are perpendicular to the viewing direction (i.e., the viewing perspective of the viewpoint 810) are referred to as the near plane 822 and the far plane 824. As indicated above, objects may be drawn/ rendered if they are within the space between the near plane 822 and the far plane 824 (i.e., farther away from the viewpoint 810 than the near plane 822 and closer to the viewpoint 810 than the far plane 824. Similarly, objects may not be drawn/rendered if they are closer to the viewpoint 810 than the near plane 822 or farther away from the viewpoint 810 than the far plane 824. As indicated herein, view frustum 820 may be utilized with different types of graphics processing, such as ray tracing.

Some aspects of graphics processing may store ray tracing data (e.g., data from a view frustum) in different types of memory at the GPU (e.g., a GPU memory or a system memory). At least one potential issue for ray tracing performance is the amount of memory bandwidth, as accessing data from memory (e.g., the GPU memory or system memory) may take a large amount of cycles to fully access. In some instances, geometry data may be stored in a bounding volume hierarchy (BVH) structure. This BVH structure is a tree structure including multiple nodes (e.g., a binary tree structure or a n-ary tree structure), where primitive data is stored in leaf nodes (i.e., the nodes in the branches of the tree structure). For each ray in the ray tracing process, the GPU may need to traverse from the root node (i.e., the top node in the tree structure) to the leaf nodes. The BVH structure may be associated with graphics processing scenes that include a number of primitives. Also, each of these primitives may correspond to one of the nodes in the BVH structure. For example, for some scenes, a BVH structure associated with the scene may hold a large number of primitives (e.g., millions of primitives).

Additionally, bounding volume hierarchies and similar data structures may be an efficient manner in which to store the geometry data for accelerating ray tracing performance. While binary BVHs with a single primitive in a leaf node and two bounding boxes in an internal node may be helpful to improve ray tracing performance, increasing the width of BVHs to certain levels may improve the performance of ray tracing at a GPU. For example, increasing the width of BVHs to certain levels (e.g., an 8-wide or 16-wide BVH with up to 8 or 16 child nodes and up to 4 primitives in leaf nodes) based on surface area heuristics (SAH) may improve the performance of ray tracing at a GPU. In turn, this may improve the overall performance of the GPU.

In some instances, rather than building all of the geometry to a single BVH, some types of application program interfaces (APIs) may split the geometry to multiple bottom-level acceleration structures (BLASs) (i.e., one or more sections of a BVH that are below another section of the BVH) which contain the primitive geometry (e.g., triangles or bounding boxes) and a top-level acceleration structure (TLAS) (i.e., one or more sections of a BVH that are above another section of the BVH). In some aspects, a TLAS may be formed with the BLAS references. Further, splitting the geometry between BLASs (i.e., bottom-level BVHs) and creating a TLAS (i.e., a top-level BVH) may increase the flexibility and reusability of the geometry, as well as increase the surface area heuristic (SAH) of the overall structure. In some instances, a BLAS may store multiple primitives in its leaf node. For example, a TLAS may store one BLAS in its leaf node due to the additional information that is needed, so multiple BLASs may not be able to be stored in a TLAS leaf node. Moreover, in the case where geometry is not split properly across the BLAS, the SAH and ray tracing performance may be degraded. For instance, geometry from different parts of a scene may be added to a BVH and not split properly across the BLAS, such that the SAH and ray tracing performance may be degraded.

Figure 9:
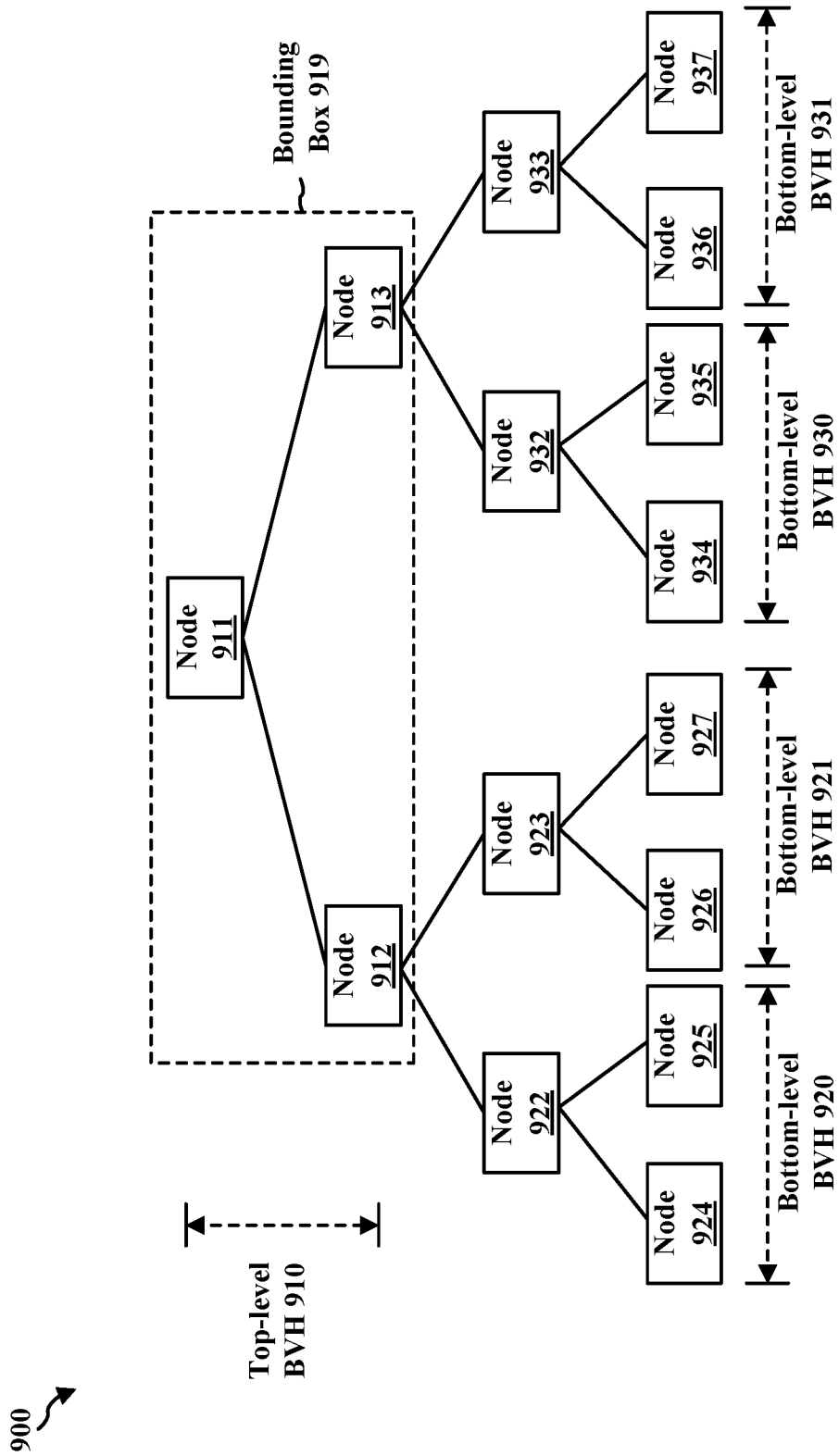
FIG. 9 is a diagram illustrating an example BVH structure for node storage.

FIG. 9 illustrates diagram 900 including one example of a BVH structure for node storage. More specifically, diagram 900 includes a top-level BVH structure (i.e., TLAS) and four bottom-level BVH structures (e.g., BLASs) for storing different nodes of the BVH structure. That is, each leaf node of top-level BVH structure 910 contains two references for a bottom-level BVH. For example, node 912 contains references for bottom-level BVH structure 920 and bottom-level BVH structure 921, while node 913 contains references for bottom-level BVH structure 930 and bottom-level BVH structure 931.

As shown in FIG. 9, diagram 900 includes at least one node in a top-level BVH structure 910 (e.g., node 911, node 912, and node 913), multiple nodes in a bottom-level BVH structure 920 (e.g., node 922, node 924, and node 925), multiple nodes in a bottom-level BVH structure 921 (e.g., node 923, node 926, and node 927), multiple nodes in a bottom-level BVH structure 930 (e.g., node 932, node 934, and node 935), and multiple nodes in a bottom-level BVH structure 931 (e.g., node 933, node 936, and node 937). In some instances, top-level BVH structure 910, bottom-level BVH structure 920, bottom-level BVH structure 921, bottom-level BVH structure 930, and bottom-level BVH structure 931 may be considered part of the same BVH structure. That is, top-level BVH structure 910 together with all references for bottom-level BVH structure 920, bottom-level BVH structure 921, bottom-level BVH structure 930, and bottom-level BVH structure 931 may form one large BVH tree.

Further, as shown in FIG. 9, each of the nodes in top-level BVH structure 910 (e.g., node 911, node 912, and node 913) may correspond to bounding box 919. In some aspects, each of the nodes depicted in FIG. 9 (e.g., node 911, node 912, node 913, node 922, node 923, node 924, node 925, node 926, node 927, node 932, node 933, node 934, node 935, node 936, and node 937) may correspond to a bounding box. Further, top-level BVH structure 910, bottom-level BVH structure 920, bottom-level BVH structure 921, bottom-level BVH structure 930, and bottom-level BVH structure 931 may each correspond to a memory allocation. For instance, a first memory of a GPU may be allocated for top-level BVH structure 910 (e.g., node 911, node 912, and node 913 in top-level BVH structure 910), a second memory of a GPU may be allocated for bottom-level BVH structure 920 (e.g., node 922, node 924, and node 925 in bottom-level BVH structure 920), a third memory of a GPU may be allocated for bottom-level BVH structure 921 (e.g., node 923, node 926, and node 927 in bottom-level BVH structure 921), a fourth memory of a GPU may be allocated for bottom-level BVH structure 930 (e.g., node 932, node 934, and node 935 in bottom-level BVH structure 930), and a fifth memory of a GPU may be allocated for bottom-level BVH structure 931 (e.g., node 933, node 936, and node 937 in bottom-level BVH structure 931).

Additionally, with the introduction of ray tracing capabilities into application program interfaces (APIs), hardware-accelerated ray tracing techniques may be utilized. For instance, application/game developers may utilize hardware-accelerated ray tracing techniques in real time three-dimensional (3D) graphics rendering. In some aspects, ray tracing may be used for limited purposes (e.g., shadows or global illumination), while other rendering steps may be performed using graphics and compute pipelines. This type of approach may be referred to as "hybrid ray tracing" as ray tracing is used for a portion of the graphics rendering. For instance, hybrid retracing may bundle ray tracing together with other graphics functions (e.g., rasterization or rendering).

As indicated above, ray tracing may utilize construction of acceleration structures (e.g., BVHs) for the geometry (e.g., triangles and other primitives). A BVH may be time-consuming to build, and it may be time-consuming to re-arrange the geometry of the scene into a hierarchical format. In some instances, a BVH may significantly increase (e.g., double) the memory overhead of storing scenes in GPU memory. Accordingly, this building of BVH structures may not provide any direct value to graphics and compute pipelines. For instance, a GPU may spend a significant amount of time building the BVH structure, which is a downside of ray tracing. This construction step may have linear complexity with respect to the primitive count (e.g., millions to billions) which creates a significant overhead at a GPU or a CPU. In some aspects, as constructing acceleration structures may provide no direct value to graphics and compute pipelines, the overhead of constructing a BVH structure may be attributed to the ray tracing process. In some instances, both a BVH and a view frustum may represent space partitioning in world space. This space partitioning may be utilized to reduce work for rasterization. For example, the intersection of a BVH and a view frustum may be utilized to cull triangles that lie outside of the view frustum. Also, it may be beneficial to utilize a view frustum in the ray tracing process to reduce the amount of nodes in the BVH structure that may need to be determined as visible in a scene or frame.

Aspects of the present disclosure may reduce the amount of primitives (e.g., primitives corresponding to nodes in a BVH structure) that may need to be determined as visible in a scene or frame. That is, aspects presented herein may reduce the amount of primitives corresponding to nodes in a BVH structure that may need to be rendered or rasterized. In some instances, aspects presented herein may utilize a view frustum in the ray tracing process. For instance, aspects presented herein (e.g., GPUs) may utilize a view frustum to reduce the amount of nodes in a BVH structure that may need to be determined as visible in a scene or frame. For example, aspects presented herein (e.g., GPUs) may utilize a view frustum to determine whether a bounding box or node is visible in a scene. In some instances, aspects presented herein may determine whether a view frustum intersects with a set of bounding boxes (e.g., top-level bounding boxes) in a BVH (e.g., a top-level BVH).

In some instances, aspects of the present disclosure (e.g., GPUs or CPUs) may utilize BVH structures to cull or discard geometry in graphics and compute pipelines. By doing so, aspects presented herein may allow BVH structures to be useful for non-ray traced rendering passes. In some aspects, a two-level acceleration structure (e.g., including a top-level acceleration structure (TLAS) and a bottom-level acceleration structure (BLAS)) may be constructed based on the BVH structure for the geometry. This type of BVH structure may provide useful information that would allow GPUs to discard triangles during three-dimensional (3D) graphics pipeline execution. For a top-level acceleration structure (TLAS), aspects presented herein may intersect or compare any axis-aligned bounding box (AABB) against a view frustum. For instance, for a TLAS, aspects presented herein (e.g., GPUs) may intersect any AABB contained in TLAS against view frustum in order to determine whether there is an intersection. If there are no intersections, all primitives may be skipped during rendering in the graphics pipeline. Further, in case there are no intersections, all primitives/triangles that are associated with a particular subtree (or a leaf node) of the TLAS may be skipped during rendering. Thus, aspects presented herein propose a culling step that takes a current view frustum and intersects it with a TLAS starting at its root node. Further, aspects presented herein may utilize information on which bottom-level acceleration structure (BLAS) may need to be rendered and/or which draw calls correspond to which BLAS. By doing so, aspects presented herein may accelerate and cull direct rendering or binning passes.

As indicated above, aspects presented herein (e.g., GPUs) may utilize a view frustum along with a TLAS and a BLAS in order to reduce the amount of nodes that may need to be searched in a BVH structure. For instance, a BVH structure may include at least one TLAS and at least one BLAS. In some aspects, a TLAS may correspond to a world space and BLAS may correspond to an object space. Also, each of the bottom nodes of a TLAS may be a leaf node or a child node, which may contain a bounding box and a world space of a corresponding BLAS. So each bottom level node in the TLAS may include a corresponding bounding box for one of the BLASs. In some examples, a TLAS may include a corresponding route bounding box that includes all of the nodes in the TLAS (e.g., all the nodes in the entire scene). Further, the bounding box for TLAS may encompass all the nodes in the BLAS. If the view frustum does not intersect with the TLAS, then all of the primitives corresponding to the TLAS nodes for the entire scene may be dropped (i.e., the corresponding primitives may not need to be rendered).

In some examples, there may be at least one TLAS and a plurality of BLASs. For instance, if the view frustum does not intersect with a root bounding box of one of the BLASs, then all of the primitives/triangles in the BLAS may be dropped (i.e., the corresponding primitives may not need to be rendered). That is, aspects presented herein may determine whether at least one top-level acceleration structure (e.g., a TLAS) is visible. Also, aspects presented herein (e.g., GPUs) may determine whether each of the bottom-level acceleration structures (e.g., BLASs) is visible. For example, there may be a significant number of primitives/triangles in the BLAS that may be dropped or discarded (e.g., 100 primitives to 10,000 primitives). By doing so, aspects of the present disclosure may significantly reduce the amount of primitives/triangles that may need to be processed at a GPU (e.g., rendered or rasterized).

In some aspects, as bounding boxes (e.g., axis-aligned bounding boxes (AABBs)) are intersected, GPUs may encounter several different approaches regarding the view frustum. In one aspect, the view frustum (i.e., visible frustum) may not intersect a particular AABB for a TLAS. In this case, all TLAS instances in the corresponding subtree may be culled or discarded. In another aspect, the view frustum (i.e., visible frustum) may intersect a TLAS leaf node. In this case, aspects presented herein (e.g., GPUs) may add the leaf node ID to the list of visible BLAS instances. The obtained list of TLAS instances may later be used to refer to the corresponding geometry when executing the graphics pipeline. Further, all TLAS instances that are not on the list (e.g., list of visible BLAS instances) may be skipped (e.g., skipped by construction).

Additionally, aspects presented herein (e.g., GPUs) may intersect or compare a view frustum against a world space bounding box (e.g., AABB). Aspects presented herein may assume that a view frustum is expressed in world space and its vertices are represented individually (e.g., v1, . . . , v8), where each vertex may have three coordinates. Also, an axis-aligned bounding box (AABB) may be represented by two corner vertices (e.g., (x1, y1, z1) and (x2, y2, z2), where x1<x2, y1<y2, and z1<z2). For each vertex of the view frustum, aspects presented herein may determine if the vertex is contained inside the AABB for each of the three coordinates (x, y, z) by comparing a first x-vertex (v1.x) against x1 and x2, comparing a first y-vertex (v1.y) against y1 and y2, and comparing a first z-vertex (v1.z) against z1 and z2. This comparison process may occur for each vertex of the view frustum (e.g., v2, . . . , v8). Also, while performing these comparison tests, aspects presented herein may compute a tri-valued intersection code. For example, if a first x-vertex (v1.x) is less than x1, aspects presented herein may assign the code to be one value (e.g., −1). Also,
if a first x-vertex (v1.x) is between x1 and x2, aspects presented herein may assign the code to be zero. Further, if a first x-vertex (v1.x) is greater than x2, aspects presented herein may assign the code to be another value (e.g., 1). This intersection of code may be helpful to reduce processing at a GPU.

In some aspects, if any of the vertices are contained within a particular AABB, it may be evident that a non-zero intersection between the frustum and the AABB has occurred. This may be determined if the intersection codes for a particular vertex are zeroes for all three dimensions (x, y, z). Otherwise, an intersection may still be possible if the AABB is fully contained within the view frustum. This may also be determined by observing intersection codes. In some instances, the full containment may occur when none of vertices of the view frustum (e.g., v1, . . . , v8) are contained inside the AABB. Also, the full containment may occur when, for each dimension (x, y, z), there exists two vertices that have an opposite intersection code (e.g., −1 and 1).

As mentioned above, aspects presented herein (e.g., GPUs) may utilize the result of the aforementioned visibility testing for geometry culling. For instance, aspects presented herein may assume that a determination has been made regarding which BLASs may need to be rendered. Aspects presented herein may also assume that a determination has been regarding which draw calls correspond to which BLASs. For example, during BVH construction, aspects presented herein (e.g., GPUs) may create additional data structures, as needed. This information may be used when performing direct rendering or performing a binning pass.

Figure 10:
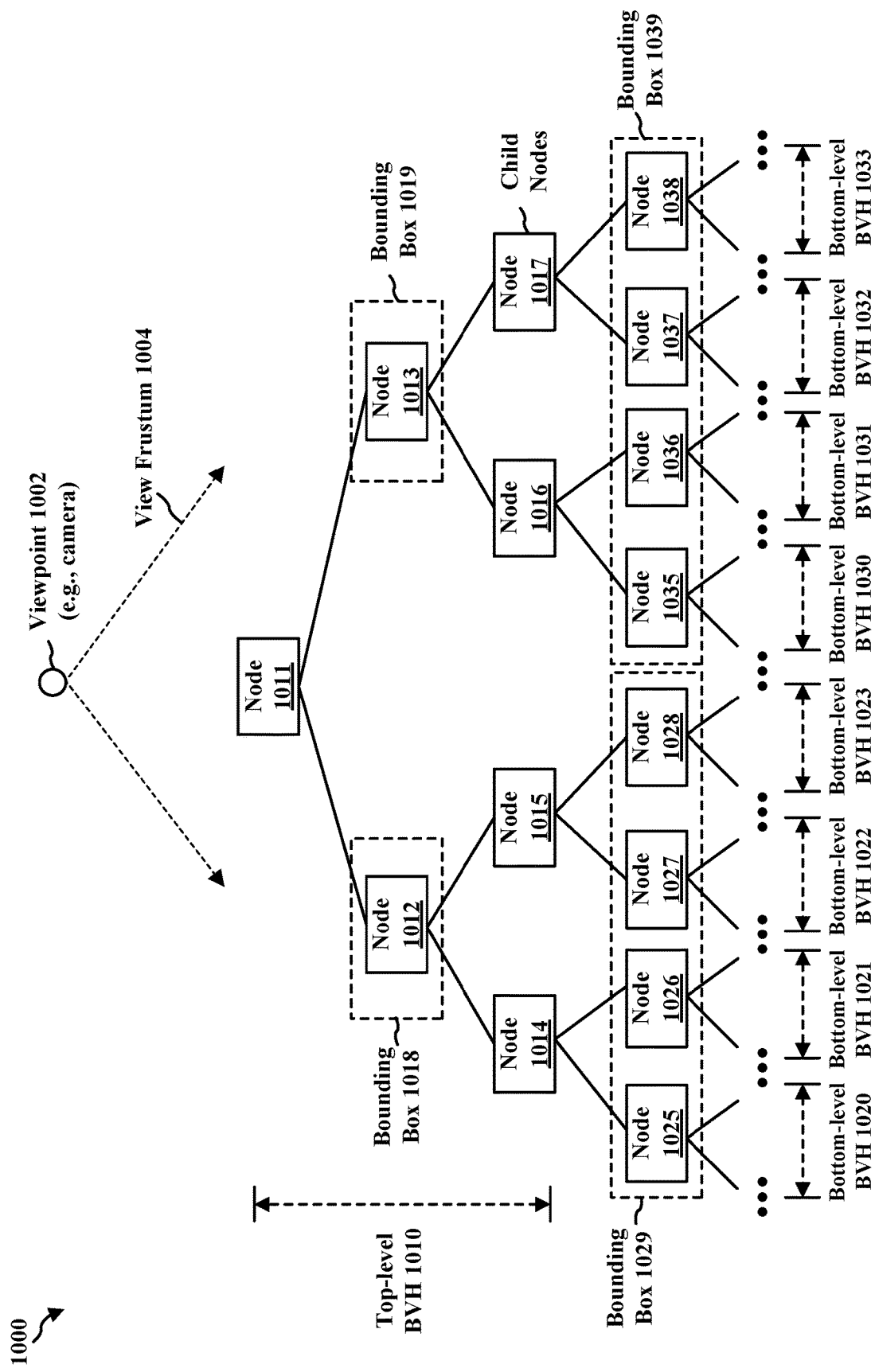
FIG. 10 is a diagram illustrating an example BVH structure for node storage including a view frustum.

FIG. 10 illustrates diagram 1000 including one example of a BVH structure for node storage. More specifically, diagram 1000 includes a top-level BVH structure (e.g., TLAS) and eight bottom-level BVH structures (e.g., BLASs) for storing different nodes of the BVH structure, as well as a view frustum (e.g., view frustum 1004 corresponding to viewpoint 1002). That is, each leaf node of top-level BVH structure 1010 contains two references for a bottom-level BVH. For example, node 1014 contains references for bottom-level BVH structure 1020 and bottom-level BVH structure 1021, node 1015 contains references for bottom-level BVH structure 1022 and bottom-level BVH structure 1023, node 1016 contains references for bottom-level BVH structure 1030 and bottom-level BVH structure 1031, and node 1017 contains references for bottom-level BVH structure 1032 and bottom-level BVH structure 1033. As shown in FIG. 10, diagram 1000 includes a set of nodes in a top-level BVH structure 1010 (e.g., node 1011, node 1012, node 1013, node 1014, node 1015, node 1016, and node 1017), a set of nodes in a bottom-level BVH structure 1020 (e.g., node 1025, etc.), a set of nodes in a bottom-level BVH structure 1021 (e.g., node 1026, etc.), a set of nodes in a bottom-level BVH structure 1022 (e.g., node 1027, etc.), a set of nodes in a bottom-level BVH structure 1023 (e.g., node 1028, etc.), a set of nodes in a bottom-level BVH structure 1030 (e.g., node 1035, etc.), a set of nodes in a bottom-level BVH structure 1031 (e.g., node 1036, etc.), a set of nodes in a bottom-level BVH structure 1032 (e.g., node 1037, etc.), and a set of nodes in a bottom-level BVH structure 1033 (e.g., node 1038, etc.). Also, as shown in FIG. 10, nodes 1014-1017 in top-level BVH structure 1010 may correspond to leaf nodes or child nodes. In some instances, top-level BVH structure 1010, bottom-level BVH structure 1020, bottom-level BVH structure 1021, bottom-level BVH structure 1022, bottom-level BVH structure 1023, bottom-level BVH structure 1030, bottom-level BVH structure 1031, bottom-level BVH structure 1032, and bottom-level BVH structure 1033 may be considered part of the same BVH structure, such that all of the nodes shown in diagram 1000 are in the same BVH structure. That is, top-level BVH structure 1010 together with all references for bottom-level BVH structure 1020, bottom-level BVH structure 1021, bottom-level BVH structure 1022, bottom-level BVH structure 1023, bottom-level BVH structure 1030, bottom-level BVH structure 1031, bottom-level BVH structure 1032, and bottom-level BVH structure 1033 may form one large BVH tree.

Additionally, as shown in FIG. 10, some of the nodes in top-level BVH structure 1010 (e.g., node 1012 and node 1013) may correspond to a bounding box. For example, node 1012 may correspond to bounding box 1018 and node 1013 may correspond to bounding box 1019. Also, some of the nodes in bottom-level BVH structures 1020-1023 may correspond to a bounding box and some of the nodes in bottom-level BVH structures 1030-1033 may correspond to a bounding box. For example, nodes 1025-1028 may correspond to bounding box 1029 and nodes 1035-1038 may correspond to bounding box 1039. In some aspects, each of the nodes depicted in FIG. 10 (e.g., node 1011, node 1012, node 1013, node 1014, node 1015, node 1016, node 1017, node 1025, node 1026, node 1027, node 1028, node 1035, node 1036, node 1037, node 1038) may correspond to a bounding box. Further, top-level BVH structure 1010, bottom-level BVH structure 1020, bottom-level BVH structure 1021, bottom-level BVH structure 1022, bottom-level BVH structure 1023, bottom-level BVH structure 1030, bottom-level BVH structure 1031, bottom-level BVH structure 1032, and bottom-level BVH structure 1033 may each correspond to a memory allocation. For instance, a first memory may be allocated for top-level BVH structure 1010 (e.g., nodes 1011-1017 in top-level BVH structure 1010), a second memory may be allocated for bottom-level BVH structure 1020 (e.g., node 1025), a third memory may be allocated for bottom-level BVH structure 1021 (e.g., node 1026), a fourth memory may be allocated for bottom-level BVH structure 1022 (e.g., node 1027), a fifth memory may be allocated for bottom-level BVH structure 1023 (e.g., node 1028), a sixth memory may be allocated for bottom-level BVH structure 1030 (e.g., node 1035), a seventh memory may be allocated for bottom-level BVH structure 1031 (e.g., node 1036), an eighth memory may be allocated for bottom-level BVH structure 1032 (e.g., node 1037), and a ninth memory may be allocated for bottom-level BVH structure 1033 (e.g., node 1038).

As depicted in FIG. 10, a GPU may obtain an indication of a bounding volume hierarchy (BVH) structure including a plurality of nodes, where the BVH structure is associated with geometry data for a plurality of primitives in a scene and each of the plurality of nodes is associated with one or more primitives of the plurality of primitives. Also, the BVH structure may include top-level BVH structure 1010 including a plurality of top-level nodes (e.g., nodes 1011-1017), a bottom-level BVH structures 1020-1023 including a plurality of bottom-level nodes (e.g., nodes 1025-1028), and a bottom-level BVH structures 1030-1033 including a plurality of bottom-level nodes (e.g., nodes 1035-1038). The top-level BVH structure 1010 may include a set of top-level bounding boxes (e.g., bounding box 1018 and bounding box 1019) associated with the plurality of top-level nodes, and bottom-level BVH structures 1020-1023 and bottom-level BVH structures 1030-1033 may include a set of bottom-level bounding boxes (e.g., bounding box 1029 and bounding box 1039) associated with the plurality of bottom-level nodes. In some aspects, a bounding box that contains the leaf node of a top-level BVH may not be the same bounding box as the root bounding box of a corresponding bottom-level BVH. For instance, as the top-level BVH may be defined in world space, the bottom level BVH may be defined in object space. When transformed from object space to world space, the bounding box of the bottom-level BVH may be contained in the bounding box of the corresponding top-level BVH leaf node. Further, the BVH structure may be associated with view frustum 1004 for a viewpoint 1002 (e.g., a camera) of a scene.

In some instances, as depicted in FIG. 10, a GPU may calculate (e.g., determine) whether the view frustum 1004 intersects with each of the set of top-level bounding boxes (e.g., bounding box 1018 and bounding box 1019) in the top-level BVH structure 1010, where each of the set of top-level bounding boxes is associated with a set of top-level child nodes (e.g., node 1014 and node 1015 are associated with bounding box 1018, while node 1016 and node 1017 are associated with bounding box 1019). Also, a GPU may calculate (e.g., determine), for each of the set of top-level bounding boxes that the view frustum 1004 intersects, whether the view frustum 1004 intersects with each of the set of top-level child nodes (e.g., nodes 1014-1017) that is associated with each of the set of top-level bounding boxes (e.g., bounding box 1018 and bounding box 1019), where each of the set of top-level child nodes (e.g., nodes 1014-1017) is associated with at least one bottom-level bounding box in the set of bottom-level bounding boxes (e.g., bounding box 1029 and bounding box 1039). In some aspects, each of nodes 1014-1017 may not be intersected by view frustum 1004 in order to determine a visibility of corresponding primitives. For example, if view frustum 1004 does not intersect with node 1012, then both node 1014 and node 1015 may not intersect with the view frustum 1004 (although these nodes may not need to be explicitly tested). Thus, testing may begin against node 1011 and then continue until a child node does not intersect the view frustum (i.e., testing may stop at this node, while noting the subtree and corresponding leaf nodes). Alternatively, testing may continue until reaching the leaf node of the TLAS. Further, a GPU may discard data for at least one of: (1) each of the set of top-level bounding boxes (e.g., bounding box 1018 and bounding box 1019) that the view frustum 1004 does not intersect, or (2) each of the set of top-level child nodes (e.g., nodes 1014-1017) that the view frustum 1004 does not intersect. Discarding the data may include refraining from including the data in a list of primitives for rendering (i.e., primitives to be rendered). Moreover, a GPU may store data associated with all of the set of top-level child nodes (e.g., nodes 1014-1017) that the view frustum 1004 intersects for each of the set of top-level bounding boxes (e.g., bounding box 1018 and bounding box 1019) that the view frustum 1004 intersects based on the calculation of whether the view frustum 1004 intersects with each of the set of top-level child nodes (e.g., nodes 1014-1017). In some instances, top-level may be referred to as first-level, and bottom-level may be referred to as second-level.

In some aspects, as depicted in FIG. 10, a GPU may output an indication of all of the set of top-level child nodes (e.g., nodes 1014-1017) that the view frustum 1004 intersects for each of the set of top-level bounding boxes (e.g., bounding box 1018 and bounding box 1019) that the view frustum 1004 intersects. A GPU may render, based on a list of primitives for rendering, all of the plurality of primitives that are associated with all of the set of top-level child nodes (e.g., nodes 1014-1017) that the view frustum 1004. Additionally, a GPU may determine (e.g., calculate), for each of the set of top-level child nodes (e.g., nodes 1014-1017) that the view frustum 1004 intersects, whether the view frustum 1004 intersects with at least one bottom-level bounding box (e.g., bounding box 1029 and bounding box 1039) that is associated with the top-level child node (e.g., nodes 1014-1017). Based on this determination, a GPU may store data for the at least one bottom-level bounding box (e.g., bounding box 1029 and bounding box 1039) that is associated with the top-level child node (e.g., nodes 1014-1017) if the view frustum 1004 intersects with the at least one bottom-level bounding box (e.g., bounding box 1029 and bounding box 1039). Also, a GPU may output an indication of the at least one bottom-level bounding box (e.g., bounding box 1029 and bounding box 1039) if the view frustum 1004 intersects with the at least one bottom-level bounding box (e.g., bounding box 1029 and bounding box 1039). Moreover, a GPU may discard data for the at least one bottom-level bounding box (e.g., bounding box 1029 and bounding box 1039) that is associated with the top-level child node (e.g., nodes 1014-1017) if the view frustum 1004 does not intersect with the at least one bottom-level bounding box (e.g., bounding box 1029 and bounding box 1039).

Aspects of the present disclosure may include a number of benefits or advantages. For instance, aspects presented herein may reduce the amount of primitives corresponding to nodes in a BVH structure that may need to be rendered or rasterized. In some instances, aspects presented herein may utilize a view frustum in the ray tracing process. For example, aspects presented herein (e.g., GPUs) may utilize a view frustum to reduce the amount of nodes in a BVH structure that may need to be determined as visible in a scene or frame. For instance, aspects presented herein (e.g., GPUs) may utilize a view frustum to determine whether a bounding box or node is visible in a scene. In some aspects, GPUs herein may determine whether a view frustum intersects with a set of bounding boxes (e.g., top-level bounding boxes) in a BVH (e.g., a top-level BVH).

Figure 11:
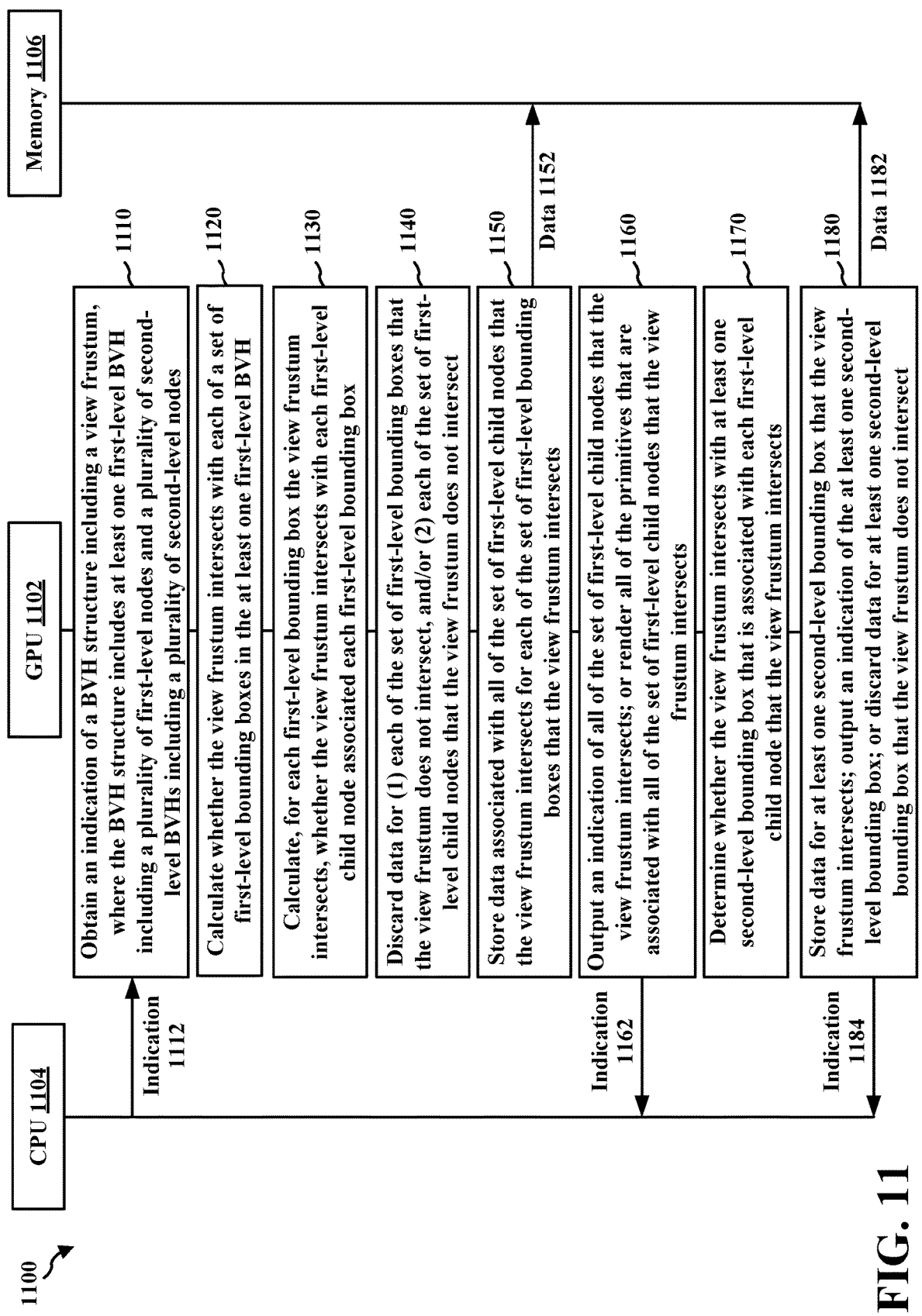
FIG. 11 is a communication flow diagram illustrating example communications between a GPU, a CPU, and a memory.

FIG. 11 is a communication flow diagram 1100 of graphics processing in accordance with one or more techniques of this disclosure. As shown in FIG. 11, diagram 1100 includes example communications between a GPU 1102 (or other graphics processor), CPU 1104 (or other central processor) or another GPU component, and memory 1106 (e.g., a graphics memory (GMEM) or a system memory (SYSMEM)), in accordance with one or more techniques of this disclosure.

At 1110, GPU 1102 may obtain an indication of a bounding volume hierarchy (BVH) structure including a plurality of nodes (e.g., GPU 1102 may obtain indication 1112 from CPU 1104), where the BVH structure is associated with geometry data for a plurality of primitives in a scene, where each of the plurality of nodes is associated with one or more primitives of the plurality of primitives, where the BVH structure includes at least one first-level BVH including a plurality of first-level nodes and a plurality of second-level BVHs including a plurality of second-level nodes, where the at least one first-level BVH includes a set of first-level bounding boxes associated with the plurality of first-level nodes, where each of the plurality of second-level BVHs includes a set of second-level bounding boxes associated with the plurality of second-level nodes, and where the BVH structure is associated with a view frustum for a viewpoint of the scene.

At 1120, GPU 1102 may calculate whether the view frustum intersects with each of the set of first-level bounding boxes in the at least one first-level BVH, where each of the set of first-level bounding boxes is associated with a set of first-level child nodes in the plurality of first-level nodes. In some aspects, calculating whether the view frustum intersects with each of the set of first-level bounding boxes may include: calculating a visibility of each of the set of first-level bounding boxes in the scene. That is, the GPU may calculate a visibility of each of the set of first-level bounding boxes in the scene. In some aspects, the viewpoint may be a camera, where the view frustum may be associated with all visible objects in the scene from a perspective of the camera, and calculating whether the view frustum intersects with each of the set of first-level bounding boxes may include: calculating whether each of the set of first-level bounding boxes is visible from the perspective of the camera. That is, the GPU may calculate whether each of the set of first-level bounding boxes is visible from the perspective of the camera.

In some aspects, each of the set of first-level bounding boxes may be associated with a set of first-level vertices, where the view frustum may be associated with a set of frustum vertices, and calculating whether the view frustum intersects with each of the set of first-level bounding boxes may include: determining whether each of the set of first-level vertices is within an area corresponding to the set of frustum vertices. That is, the GPU may determine whether each of the set of first-level vertices is within an area corresponding to the set of frustum vertices. Also, each of the set of first-level vertices may be associated with a set of first-level coordinates, where determining whether each of the set of first-level vertices is within the area corresponding to the set of frustum vertices may include: comparing each of the set of first-level coordinates with the area corresponding to the set of frustum vertices. That is, the GPU may compare each of the set of first-level coordinates with the area corresponding to the set of frustum vertices. Further, each of the set of first-level vertices may correspond to a set of first-level planes for each of the set of first-level bounding boxes, where determining whether each of the set of first-level vertices is within the area corresponding to the set of frustum vertices may include: comparing each of the set of first-level planes with the area corresponding to the set of frustum vertices. That is, the GPU may compare each of the set of first-level planes with the area corresponding to the set of frustum vertices.

At 1130, GPU 1102 may calculate, for each of the set of first-level bounding boxes that the view frustum intersects, whether the view frustum intersects with each of the set of first-level child nodes that is associated with each of the set of first-level bounding boxes, where each of the set of first-level child nodes is associated with at least one second-level bounding box in the set of second-level bounding boxes. In some aspects, the set of first-level child nodes may correspond to a bottom level in the at least one first-level BVH, and the at least one second-level bounding box that is associated with each of the set of first-level child nodes may correspond to a top level in the plurality of second-level BVHs. Additionally, the at least one first-level BVH may be a top-level acceleration structure (TLAS) in the BVH structure including the plurality of first-level nodes, and each of the plurality of second-level BVHs may be a bottom-level acceleration structure (BLAS) in the BVH structure including the plurality of second-level nodes, where the set of first-level bounding boxes may be a set of first-level axis-aligned bounding boxes (AABBs), and where each of the set of second-level bounding boxes may be a set of second-level AABBs.

At 1140, GPU 1102 may discard data for at least one of: (1) each of the set of first-level bounding boxes that the view frustum does not intersect, or (2) each of the set of first-level child nodes that the view frustum does not intersect. In some aspects, discarding the data for at least one of: (1) each of the set of first-level bounding boxes that the view frustum does not intersect, or (2) each of the set of first-level child nodes that the view frustum does not intersect may include: refraining from including, in a list of primitives for rendering, the data for at least one of: (1) each of the set of first-level bounding boxes that the view frustum does not intersect, or (2) each of the set of first-level child nodes that the view frustum does not intersect. That is, the GPU may refrain from including, in a list of primitives for rendering, the data for at least one of: (1) each of the set of first-level bounding boxes that the view frustum does not intersect, or (2) each of the set of first-level child nodes that the view frustum does not intersect. Also, discarding the data for at least one of: (1) each of the set of first-level bounding boxes that the view frustum does not intersect, or (2) each of the set of first-level child nodes that the view frustum does not intersect may include: culling the data for at least one of: (1) each of the set of first-level bounding boxes that the view frustum does not intersect, or (2) each of the set of first-level child nodes that the view frustum does not intersect. That is, the GPU may cull the data for at least one of: (1) each of the set of first-level bounding boxes that the view frustum does not intersect, or (2) each of the set of first-level child nodes that the view frustum does not intersect.

At 1150, GPU 1102 may store data associated with all of the set of first-level child nodes that the view frustum intersects for each of the set of first-level bounding boxes that the view frustum intersects based on the calculation of whether the view frustum intersects with each of the set of first-level child nodes (e.g., GPU 1102 may store data 1152 in memory 1106).

At 1160, GPU 1102 may output an indication of all of the set of first-level child nodes that the view frustum intersects for each of the set of first-level bounding boxes that the view frustum intersects (e.g., GPU 1102 may output indication 1162 to CPU 1104). In some aspects, all of the plurality of primitives that are associated with all of the set of first-level child nodes that the view frustum intersects may be included in a list of primitives for rendering. Additionally, at 1160, GPU 1102 may render, based on a list of primitives for rendering, all of the plurality of primitives that are associated with all of the set of first-level child nodes that the view frustum intersects. In some aspects, outputting the indication of all of the set of first-level child nodes that the view frustum intersects may include: transmitting an indication of the list of primitives for rendering. That is, the GPU may transmit an indication of the list of primitives for rendering.

At 1170, GPU 1102 may determine, for each of the set of first-level child nodes that the view frustum intersects, whether the view frustum intersects with the at least one second-level bounding box that is associated with the first-level child node.

At 1180, GPU 1102 may store data for the at least one second-level bounding box that is associated with the first-level child node if the view frustum intersects with the at least one second-level bounding box (e.g., GPU 1102 may store data 1182 in memory 1106). Also, at 1180, GPU 1102 may output an indication of the at least one second-level bounding box if the view frustum intersects with the at least one second-level bounding box (e.g., GPU 1102 may output indication 1184 to CPU 1104). Further, at 1180, GPU 1102 may discard data for the at least one second-level bounding box that is associated with the first-level child node if the view frustum does not intersect with the at least one second-level bounding box.

Figure 12:
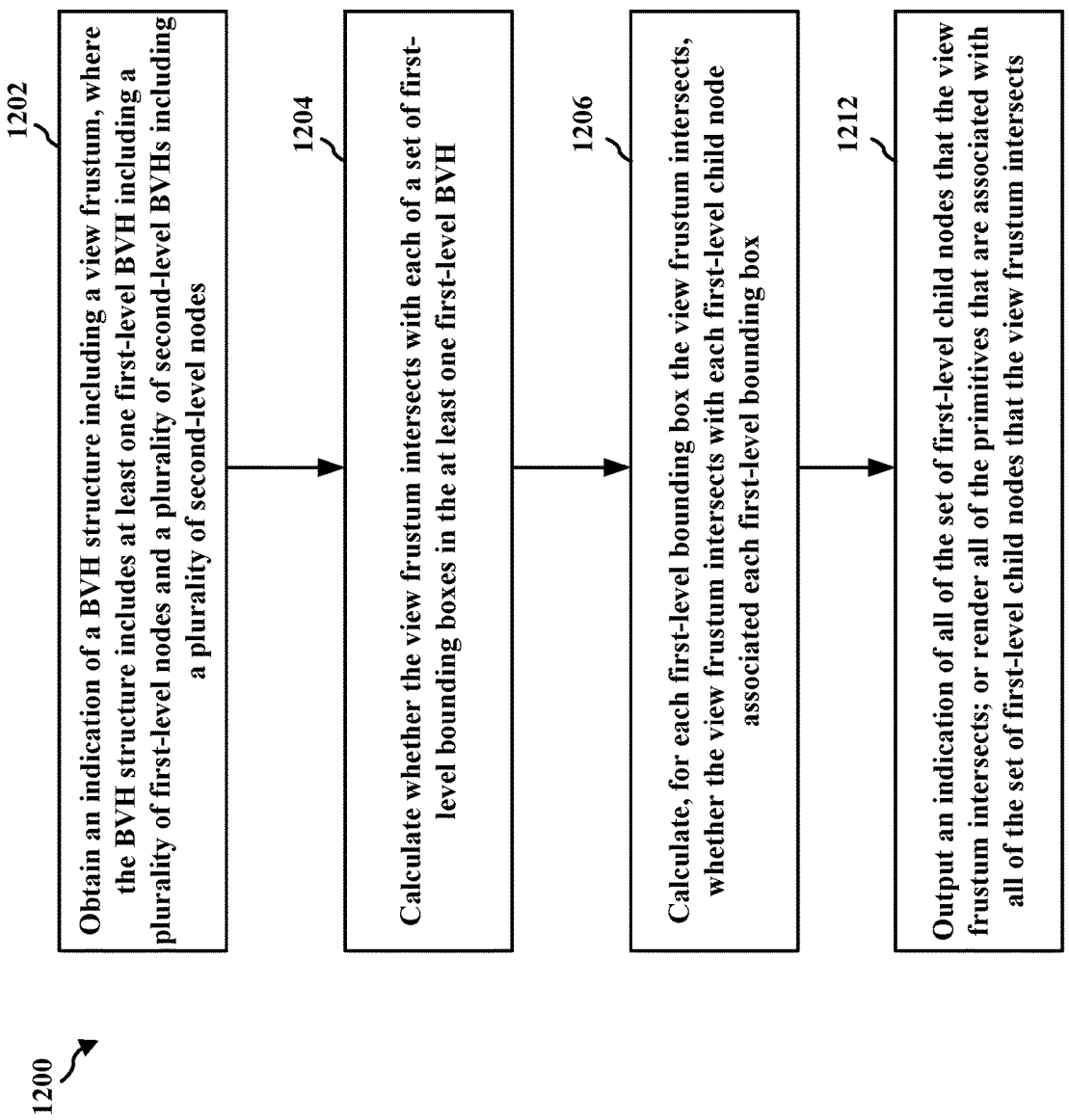
FIG. 12 is a flowchart of an example method of graphics processing.

FIG. 12 is a flowchart 1200 of an example method of graphics processing in accordance with one or more techniques of this disclosure. The method may be performed by a GPU, such as an apparatus for graphics processing, a graphics processor, a CPU, a wireless communication device, and/or any apparatus that may perform graphics processing as used in connection with the examples of FIGS. 1-11. The methods described herein may provide a number of benefits, such as improving resource utilization and/or power savings.

At 1202, the GPU may obtain an indication of a bounding volume hierarchy (BVH) structure including a plurality of nodes, where the BVH structure is associated with geometry data for a plurality of primitives in a scene, where each of the plurality of nodes is associated with one or more primitives of the plurality of primitives, where the BVH structure includes at least one first-level BVH including a plurality of first-level nodes and a plurality of second-level BVHs including a plurality of second-level nodes, where the at least one first-level BVH includes a set of first-level bounding boxes associated with the plurality of first-level nodes, where each of the plurality of second-level BVHs includes a set of second-level bounding boxes associated with the plurality of second-level nodes, and where the BVH structure is associated with a view frustum for a viewpoint of the scene, as described in connection with the examples in FIGS. 1-10. For example, as described in 1110 of FIG. 11, GPU 1102 may obtain an indication of a bounding volume hierarchy (BVH) structure including a plurality of nodes, where the BVH structure is associated with geometry data for a plurality of primitives in a scene, where each of the plurality of nodes is associated with one or more primitives of the plurality of primitives, where the BVH structure includes at least one first-level BVH including a plurality of first-level nodes and a plurality of second-level BVHs including a plurality of second-level nodes, where the at least one first-level BVH includes a set of first-level bounding boxes associated with the plurality of first-level nodes, where each of the plurality of second-level BVHs includes a set of second-level bounding boxes associated with the plurality of second-level nodes, and where the BVH structure is associated with a view frustum for a viewpoint of the scene. Further, step 1202 may be performed by processing unit 120 in FIG. 1.

At 1204, the GPU may calculate whether the view frustum intersects with each of the set of first-level bounding boxes in the at least one first-level BVH, where each of the set of first-level bounding boxes is associated with a set of first-level child nodes in the plurality of first-level nodes, as described in connection with the examples in FIGS. 1-10. For example, as described in 1120 of FIG. 11, GPU 1102 may calculate whether the view frustum intersects with each of the set of first-level bounding boxes in the at least one first-level BVH, where each of the set of first-level bounding boxes is associated with a set of first-level child nodes in the plurality of first-level nodes. Further, step 1204 may be performed by processing unit 120 in FIG. 1. In some aspects, calculating whether the view frustum intersects with each of the set of first-level bounding boxes may include: calculating a visibility of each of the set of first-level bounding boxes in the scene. That is, the GPU may calculate a visibility of each of the set of first-level bounding boxes in the scene. In some aspects, the viewpoint may be a camera, where the view frustum may be associated with all visible objects in the scene from a perspective of the camera, and calculating whether the view frustum intersects with each of the set of first-level bounding boxes may include: calculating whether each of the set of first-level bounding boxes is visible from the perspective of the camera. That is, the GPU may calculate whether each of the set of first-level bounding boxes is visible from the perspective of the camera.

In some aspects, each of the set of first-level bounding boxes may be associated with a set of first-level vertices, where the view frustum may be associated with a set of frustum vertices, and calculating whether the view frustum intersects with each of the set of first-level bounding boxes may include: determining whether each of the set of first-level vertices is within an area corresponding to the set of frustum vertices. That is, the GPU may determine whether each of the set of first-level vertices is within an area corresponding to the set of frustum vertices. Also, each of the set of first-level vertices may be associated with a set of first-level coordinates, where determining whether each of the set of first-level vertices is within the area corresponding to the set of frustum vertices may include: comparing each of the set of first-level coordinates with the area corresponding to the set of frustum vertices. That is, the GPU may compare each of the set of first-level coordinates with the area corresponding to the set of frustum vertices. Further, each of the set of first-level vertices may correspond to a set of first-level planes for each of the set of first-level bounding boxes, where determining whether each of the set of first-level vertices is within the area corresponding to the set of frustum vertices may include: comparing each of the set of first-level planes with the area corresponding to the set of frustum vertices. That is, the GPU may compare each of the set of first-level planes with the area corresponding to the set of frustum vertices.

At 1206, the GPU may calculate, for each of the set of first-level bounding boxes that the view frustum intersects, whether the view frustum intersects with each of the set of first-level child nodes that is associated with each of the set of first-level bounding boxes, where each of the set of first-level child nodes is associated with at least one second-level bounding box in the set of second-level bounding boxes, as described in connection with the examples in FIGS. 1-10. For example, as described in 1130 of FIG. 11, GPU 1102 may calculate, for each of the set of first-level bounding boxes that the view frustum intersects, whether the view frustum intersects with each of the set of first-level child nodes that is associated with each of the set of first-level bounding boxes, where each of the set of first-level child nodes is associated with at least one second-level bounding box in the set of second-level bounding boxes. Further, step 1206 may be performed by processing unit 120 in FIG. 1. In some aspects, the set of first-level child nodes may correspond to a bottom level in the at least one first-level BVH, and the at least one second-level bounding box that is associated with each of the set of first-level child nodes may correspond to a top level in the plurality of second-level BVHs. Additionally, the at least one first-level BVH may be a top-level acceleration structure (TLAS) in the BVH structure including the plurality of first-level nodes, and each of the plurality of second-level BVHs may be a bottom-level acceleration structure (BLAS) in the BVH structure including the plurality of second-level nodes, where the set of first-level bounding boxes may be a set of first-level axis-aligned bounding boxes (AABBs), and where each of the set of second-level bounding boxes may be a set of second-level AABBs.

At 1212, the GPU may output an indication of all of the set of first-level child nodes that the view frustum intersects for each of the set of first-level bounding boxes that the view frustum intersects, as described in connection with the examples in FIGS. 1-10. For example, as described in 1160 of FIG. 11, GPU 1102 may output an indication of all of the set of first-level child nodes that the view frustum intersects for each of the set of first-level bounding boxes that the view frustum intersects. Further, step 1212 may be performed by processing unit 120 in FIG. 1. In some aspects, all of the plurality of primitives that are associated with all of the set of first-level child nodes that the view frustum intersects may be included in a list of primitives for rendering. Additionally, at 1212, the GPU may render, based on a list of primitives for rendering, all of the plurality of primitives that are associated with all of the set of first-level child nodes that the view frustum intersects, as described in connection with the examples in FIGS. 1-10. For example, as described in 1160 of FIG. 11, GPU 1102 may output an indication of all of the set of first-level child nodes that the view frustum intersects for each of the set of first-level bounding boxes that the view frustum intersects. Further, step 1212 may be performed by processing unit 120 in FIG. 1. In some aspects, outputting the indication of all of the set of first-level child nodes that the view frustum intersects may include: transmitting an indication of the list of primitives for rendering. That is, the GPU may transmit an indication of the list of primitives for rendering.

Figure 13:
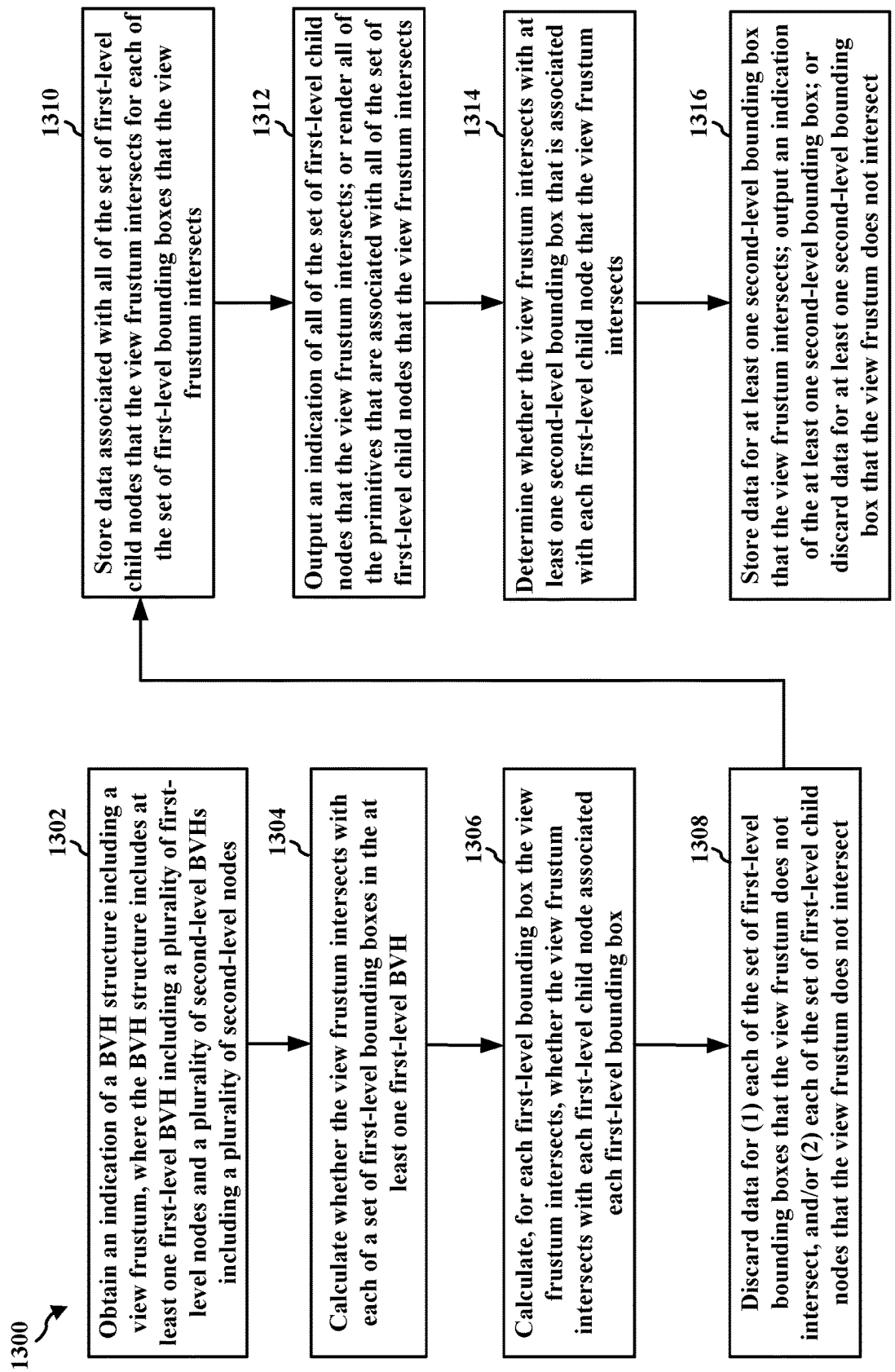
FIG. 13 is a flowchart of an example method of graphics processing.

FIG. 13 is a flowchart 1300 of an example method of graphics processing in accordance with one or more techniques of this disclosure. The method may be performed by a GPU, such as an apparatus for graphics processing, a graphics processor, a CPU, a wireless communication device, and/or any apparatus that may perform graphics processing as used in connection with the examples of FIGS. 1-11. The methods described herein may provide a number of benefits, such as improving resource utilization and/or power savings.

At 1302, the GPU may obtain an indication of a bounding volume hierarchy (BVH) structure including a plurality of nodes, where the BVH structure is associated with geometry data for a plurality of primitives in a scene, where each of the plurality of nodes is associated with one or more primitives of the plurality of primitives, where the BVH structure includes at least one first-level BVH including a plurality of first-level nodes and a plurality of second-level BVHs including a plurality of second-level nodes, where the at least one first-level BVH includes a set of first-level bounding boxes associated with the plurality of first-level nodes, where each of the plurality of second-level BVHs includes a set of second-level bounding boxes associated with the plurality of second-level nodes, and where the BVH structure is associated with a view frustum for a viewpoint of the scene, as described in connection with the examples in FIGS. 1-10. For example, as described in 1110 of FIG. 11, GPU 1102 may obtain an indication of a bounding volume hierarchy (BVH) structure including a plurality of nodes, where the BVH structure is associated with geometry data for a plurality of primitives in a scene, where each of the plurality of nodes is associated with one or more primitives of the plurality of primitives, where the BVH structure includes at least one first-level BVH including a plurality of first-level nodes and a plurality of second-level BVHs including a plurality of second-level nodes, where the at least one first-level BVH includes a set of first-level bounding boxes associated with the plurality of first-level nodes, where each of the plurality of second-level BVHs includes a set of second-level bounding boxes associated with the plurality of second-level nodes, and where the BVH structure is associated with a view frustum for a viewpoint of the scene. Further, step 1302 may be performed by processing unit 120 in FIG. 1.

At 1304, the GPU may calculate whether the view frustum intersects with each of the set of first-level bounding boxes in the at least one first-level BVH, where each of the set of first-level bounding boxes is associated with a set of first-level child nodes in the plurality of first-level nodes, as described in connection with the examples in FIGS. 1-10. For example, as described in 1120 of FIG. 11, GPU 1102 may calculate whether the view frustum intersects with each of the set of first-level bounding boxes in the at least one first-level BVH, where each of the set of first-level bounding boxes is associated with a set of first-level child nodes in the plurality of first-level nodes. Further, step 1304 may be performed by processing unit 120 in FIG. 1. In some aspects, calculating whether the view frustum intersects with each of the set of first-level bounding boxes may include: calculating a visibility of each of the set of first-level bounding boxes in the scene. That is, the GPU may calculate a visibility of each of the set of first-level bounding boxes in the scene. In some aspects, the viewpoint may be a camera, where the view frustum may be associated with all visible objects in the scene from a perspective of the camera, and calculating whether the view frustum intersects with each of the set of first-level bounding boxes may include: calculating whether each of the set of first-level bounding boxes is visible from the perspective of the camera. That is, the GPU may calculate whether each of the set of first-level bounding boxes is visible from the perspective of the camera.

In some aspects, each of the set of first-level bounding boxes may be associated with a set of first-level vertices, where the view frustum may be associated with a set of frustum vertices, and calculating whether the view frustum intersects with each of the set of first-level bounding boxes may include: determining whether each of the set of first-level vertices is within an area corresponding to the set of frustum vertices. That is, the GPU may determine whether each of the set of first-level vertices is within an area corresponding to the set of frustum vertices. Also, each of the set of first-level vertices may be associated with a set of first-level coordinates, where determining whether each of the set of first-level vertices is within the area corresponding to the set of frustum vertices may include: comparing each of the set of first-level coordinates with the area corresponding to the set of frustum vertices. That is, the GPU may compare each of the set of first-level coordinates with the area corresponding to the set of frustum vertices. Further, each of the set of first-level vertices may correspond to a set of first-level planes for each of the set of first-level bounding boxes, where determining whether each of the set of first-level vertices is within the area corresponding to the set of frustum vertices may include: comparing each of the set of first-level planes with the area corresponding to the set of frustum vertices. That is, the GPU may compare each of the set of first-level planes with the area corresponding to the set of frustum vertices.

At 1306, the GPU may calculate, for each of the set of first-level bounding boxes that the view frustum intersects, whether the view frustum intersects with each of the set of first-level child nodes that is associated with each of the set of first-level bounding boxes, where each of the set of first-level child nodes is associated with at least one second-level bounding box in the set of second-level bounding boxes, as described in connection with the examples in FIGS. 1-10. For example, as described in 1130 of FIG. 11, GPU 1102 may calculate, for each of the set of first-level bounding boxes that the view frustum intersects, whether the view frustum intersects with each of the set of first-level child nodes that is associated with each of the set of first-level bounding boxes, where each of the set of first-level child nodes is associated with at least one second-level bounding box in the set of second-level bounding boxes. Further, step 1306 may be performed by processing unit 120 in FIG. 1. In some aspects, the set of first-level child nodes may correspond to a bottom level in the at least one first-level BVH, and the at least one second-level bounding box that is associated with each of the set of first-level child nodes may correspond to a top level in the plurality of second-level BVHs. Additionally, the at least one first-level BVH may be a top-level acceleration structure (TLAS) in the BVH structure including the plurality of first-level nodes, and each of the plurality of second-level BVHs may be a bottom-level acceleration structure (BLAS) in the BVH structure including the plurality of second-level nodes, where the set of first-level bounding boxes may be a set of first-level axis-aligned bounding boxes (AABBs), and where each of the set of second-level bounding boxes may be a set of second-level AABBs.

At 1308, the GPU may discard data for at least one of: (1) each of the set of first-level bounding boxes that the view frustum does not intersect, or (2) each of the set of first-level child nodes that the view frustum does not intersect, as described in connection with the examples in FIGS. 1-10. For example, as described in 1140 of FIG. 11, GPU 1102 may discard data for at least one of: (1) each of the set of first-level bounding boxes that the view frustum does not intersect, or (2) each of the set of first-level child nodes that the view frustum does not intersect. Further, step 1308 may be performed by processing unit 120 in FIG. 1. In some aspects, discarding the data for at least one of: (1) each of the set of first-level bounding boxes that the view frustum does not intersect, or (2) each of the set of first-level child nodes that the view frustum does not intersect may include: refraining from including, in a list of primitives for rendering, the data for at least one of: (1) each of the set of first-level bounding boxes that the view frustum does not intersect, or (2) each of the set of first-level child nodes that the view frustum does not intersect. That is, the GPU may refrain from including, in a list of primitives for rendering, the data for at least one of: (1) each of the set of first-level bounding boxes that the view frustum does not intersect, or (2) each of the set of first-level child nodes that the view frustum does not intersect. Also, discarding the data for at least one of: (1) each of the set of first-level bounding boxes that the view frustum does not intersect, or (2) each of the set of first-level child nodes that the view frustum does not intersect may include: culling the data for at least one of: (1) each of the set of first-level bounding boxes that the view frustum does not intersect, or (2) each of the set of first-level child nodes that the view frustum does not intersect. That is, the GPU may cull the data for at least one of: (1) each of the set of first-level bounding boxes that the view frustum does not intersect, or (2) each of the set of first-level child nodes that the view frustum does not intersect.

At 1310, the GPU may store data associated with all of the set of first-level child nodes that the view frustum intersects for each of the set of first-level bounding boxes that the view frustum intersects based on the calculation of whether the view frustum intersects with each of the set of first-level child nodes, as described in connection with the examples in FIGS. 1-10. For example, as described in 1150 of FIG. 11, GPU 1102 may store data associated with all of the set of first-level child nodes that the view frustum intersects for each of the set of first-level bounding boxes that the view frustum intersects based on the calculation of whether the view frustum intersects with each of the set of first-level child nodes. Further, step 1310 may be performed by processing unit 120 in FIG. 1.

At 1312, the GPU may output an indication of all of the set of first-level child nodes that the view frustum intersects for each of the set of first-level bounding boxes that the view frustum intersects, as described in connection with the examples in FIGS. 1-10. For example, as described in 1160 of FIG. 11, GPU 1102 may output an indication of all of the set of first-level child nodes that the view frustum intersects for each of the set of first-level bounding boxes that the view frustum intersects. Further, step 1312 may be performed by processing unit 120 in FIG. 1. In some aspects, all of the plurality of primitives that are associated with all of the set of first-level child nodes that the view frustum intersects may be included in a list of primitives for rendering. Additionally, at 1312, the GPU may render, based on a list of primitives for rendering, all of the plurality of primitives that are associated with all of the set of first-level child nodes that the view frustum intersects, as described in connection with the examples in FIGS. 1-10. For example, as described in 1160 of FIG. 11, GPU 1102 may output an indication of all of the set of first-level child nodes that the view frustum intersects for each of the set of first-level bounding boxes that the view frustum intersects. Further, step 1312 may be performed by processing unit 120 in FIG. 1. In some aspects, outputting the indication of all of the set of first-level child nodes that the view frustum intersects may include: transmitting an indication of the list of primitives for rendering. That is, the GPU may transmit an indication of the list of primitives for rendering.

At 1314, the GPU may determine, for each of the set of first-level child nodes that the view frustum intersects, whether the view frustum intersects with the at least one second-level bounding box that is associated with the first-level child node, as described in connection with the examples in FIGS. 1-10. For example, as described in 1170 of FIG. 11, GPU 1102 may determine, for each of the set of first-level child nodes that the view frustum intersects, whether the view frustum intersects with the at least one second-level bounding box that is associated with the first-level child node. Further, step 1314 may be performed by processing unit 120 in FIG. 1.

At 1316, the GPU may store data for the at least one second-level bounding box that is associated with the first-level child node if the view frustum intersects with the at least one second-level bounding box, as described in connection with the examples in FIGS. 1-10. For example, as described in 1180 of FIG. 11, GPU 1102 may store data for the at least one second-level bounding box that is associated with the first-level child node if the view frustum intersects with the at least one second-level bounding box. Further, step 1316 may be performed by processing unit 120 in FIG. 1. Also, at 1316, the GPU may output an indication of the at least one second-level bounding box if the view frustum intersects with the at least one second-level bounding box, as described in connection with the examples in FIGS. 1-10. For example, as described in 1180 of FIG. 11, GPU 1102 may output an indication of the at least one second-level bounding box if the view frustum intersects with the at least one second-level bounding box. Further, step 1316 may be performed by processing unit 120 in FIG. 1. Further, at 1316, the GPU may discard data for the at least one second-level bounding box that is associated with the first-level child node if the view frustum does not intersect with the at least one second-level bounding box, as described in connection with the examples in FIGS. 1-10. For example, as described in 1180 of FIG. 11, GPU 1102 may discard data for the at least one second-level bounding box that is associated with the first-level child node if the view frustum does not intersect with the at least one second-level bounding box. Further, step 1316 may be performed by processing unit 120 in FIG. 1.

In configurations, a method or an apparatus for graphics processing is provided. The apparatus may be a GPU, a graphics processor, or some other processor that may perform graphics processing. In aspects, the apparatus may be the processing unit 120 within the device 104, or may be some other hardware within the device 104 or another device. The apparatus, e.g., processing unit 120, may include means for obtaining an indication of a bounding volume hierarchy (BVH) structure including a plurality of nodes, where the BVH structure is associated with geometry data for a plurality of primitives in a scene, where each of the plurality of nodes is associated with one or more primitives of the plurality of primitives, where the BVH structure includes at least one first-level BVH including a plurality of first-level nodes and a plurality of second-level BVHs including a plurality of second-level nodes, where the at least one first-level BVH includes a set of first-level bounding boxes associated with the plurality of first-level nodes, where each of the plurality of second-level BVHs includes a set of second-level bounding boxes associated with the plurality of second-level nodes, and where the BVH structure is associated with a view frustum for a viewpoint of the scene. The apparatus, e.g., processing unit 120, may also include means for calculating whether the view frustum intersects with each of the set of first-level bounding boxes in the at least one first-level BVH, where each of the set of first-level bounding boxes is associated with a set of first-level child nodes in the plurality of first-level nodes. The apparatus, e.g., processing unit 120, may also include means for calculating, for each of the set of first-level bounding boxes that the view frustum intersects, whether the view frustum intersects with each of the set of first-level child nodes that is associated with each of the set of first-level bounding boxes, where each of the set of first-level child nodes is associated with at least one second-level bounding box in the set of second-level bounding boxes. The apparatus, e.g., processing unit 120, may also include means for outputting an indication of all of the set of first-level child nodes that the view frustum intersects for each of the set of first-level bounding boxes that the view frustum intersects. The apparatus, e.g., processing unit 120, may also include means for storing data associated with all of the set of first-level child nodes that the view frustum intersects for each of the set of first-level bounding boxes that the view frustum intersects based on the calculation of whether the view frustum intersects with each of the set of first-level child nodes. The apparatus, e.g., processing unit 120, may also include means for rendering, based on the list of primitives for rendering, all of the plurality of primitives that are associated with all of the set of first-level child nodes that the view frustum intersects. The apparatus, e.g., processing unit 120, may also include means for discarding data for at least one of: (1) each of the set of first-level bounding boxes that the view frustum does not intersect, or (2) each of the set of first-level child nodes that the view frustum does not intersect. The apparatus, e.g., processing unit 120, may also include means for determining, for each of the set of first-level child nodes that the view frustum intersects, whether the view frustum intersects with the at least one second-level bounding box that is associated with the first-level child node. The apparatus, e.g., processing unit 120, may also include means for storing data for the at least one second-level bounding box that is associated with the first-level child node if the view frustum intersects with the at least one second-level bounding box. The apparatus, e.g., processing unit 120, may also include means for outputting an indication of the at least one second-level bounding box if the view frustum intersects with the at least one second-level bounding box. The apparatus, e.g., processing unit 120, may also include means for discarding data for the at least one second-level bounding box that is associated with the first-level child node if the view frustum does not intersect with the at least one second-level bounding box.

The subject matter described herein may be implemented to realize one or more benefits or advantages. For instance, the described graphics processing techniques may be used by a GPU, a graphics processor, or some other processor that may perform graphics processing to implement the geometry culling techniques described herein. This may also be accomplished at a low cost compared to other graphics processing techniques. Moreover, the graphics processing techniques herein may improve or speed up data processing or execution. Further, the graphics processing techniques herein may improve resource or data utilization and/or resource efficiency. Additionally, aspects of the present disclosure may utilize geometry culling techniques in order to improve memory bandwidth efficiency and/or increase processing speed at a GPU.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term "or" may be interpreted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that may be accessed by one or more computers or one or more processors to retrieve instructions, code and/or data structures for implementation of the techniques described in this disclosure. By way of example, and not limitation, such computer-readable media may comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is an apparatus for graphics processing including at least one processor coupled to a memory and, based at least in part on information stored in the memory, the at least one processor is configured to: obtain an indication of a bounding volume hierarchy (BVH) structure including a plurality of nodes, where the BVH structure is associated with geometry data for a plurality of primitives in a scene, where each of the plurality of nodes is associated with one or more primitives of the plurality of primitives, where the BVH structure includes at least one first-level BVH including a plurality of first-level nodes and a plurality of second-level BVHs including a plurality of second-level nodes, where the at least one first-level BVH includes a set of first-level bounding boxes associated with the plurality of first-level nodes, where each of the plurality of second-level BVHs includes a set of second-level bounding boxes associated with the plurality of second-level nodes, and where the BVH structure is associated with a view frustum for a viewpoint of the scene; calculate whether the view frustum intersects with each of the set of first-level bounding boxes in the at least one first-level BVH, where each of the set of first-level bounding boxes is associated with a set of first-level child nodes in the plurality of first-level nodes; calculate, for each of the set of first-level bounding boxes that the view frustum intersects, whether the view frustum intersects with each of the set of first-level child nodes that is associated with each of the set of first-level bounding boxes, where each of the set of first-level child nodes is associated with at least one second-level bounding box in the set of second-level bounding boxes; and output an indication of all of the set of first-level child nodes that the view frustum intersects for each of the set of first-level bounding boxes that the view frustum intersects.

Aspect 2 is the apparatus of aspect 1, where the at least one processor is further configured to: store data associated with all of the set of first-level child nodes that the view frustum intersects for each of the set of first-level bounding boxes that the view frustum intersects based on the calculation of whether the view frustum intersects with each of the set of first-level child nodes.

Aspect 3 is the apparatus of any of aspects 1 to 2, where all of the plurality of primitives that are associated with all of the set of first-level child nodes that the view frustum intersects are included in a list of primitives for rendering.

Aspect 4 is the apparatus of aspect 3, where the at least one processor is further configured to: render, based on the list of primitives for rendering, all of the plurality of primitives that are associated with all of the set of first-level child nodes that the view frustum intersects.

Aspect 5 is the apparatus of any of aspects 3 to 4, where to output the indication of all of the set of first-level child nodes that the view frustum intersects, the at least one processor is configured to: transmit an indication of the list of primitives for rendering.

Aspect 6 is the apparatus of any of aspects 1 to 5, where the at least one processor is further configured to: discard data for at least one of: (1) each of the set of first-level bounding boxes that the view frustum does not intersect, or (2) each of the set of first-level child nodes that the view frustum does not intersect.

Aspect 7 is the apparatus of aspect 6, where to discard the data for at least one of: (1) each of the set of first-level bounding boxes that the view frustum does not intersect, or (2) each of the set of first-level child nodes that the view frustum does not intersect, the at least one processor is configured to: refrain from including, in a list of primitives for rendering, the data for at least one of: (1) each of the set of first-level bounding boxes that the view frustum does not intersect, or (2) each of the set of first-level child nodes that the view frustum does not intersect.

Aspect 8 is the apparatus of any of aspects 6 to 7, where to discard the data for at least one of: (1) each of the set of first-level bounding boxes that the view frustum does not intersect, or (2) each of the set of first-level child nodes that the view frustum does not intersect, the at least one processor is configured to: cull the data for at least one of: (1) each of the set of first-level bounding boxes that the view frustum does not intersect, or (2) each of the set of first-level child nodes that the view frustum does not intersect.

Aspect 9 is the apparatus of any of aspects 1 to 8, where to calculate whether the view frustum intersects with each of the set of first-level bounding boxes, the at least one processor is configured to: calculate a visibility of each of the set of first-level bounding boxes in the scene.

Aspect 10 is the apparatus of any of aspects 1 to 9, where the at least one processor is further configured to: determine, for each of the set of first-level child nodes that the view frustum intersects, whether the view frustum intersects with the at least one second-level bounding box that is associated with the first-level child node.

Aspect 11 is the apparatus of aspect 10, where the at least one processor is further configured to: store data for the at least one second-level bounding box that is associated with the first-level child node if the view frustum intersects with the at least one second-level bounding box; or output an indication of the at least one second-level bounding box if the view frustum intersects with the at least one second-level bounding box.

Aspect 12 is the apparatus of any of aspects 10 to 11, where the at least one processor is further configured to: discard data for the at least one second-level bounding box that is associated with the first-level child node if the view frustum does not intersect with the at least one second-level bounding box.

Aspect 13 is the apparatus of any of aspects 1 to 12, where the viewpoint is a camera, where the view frustum is associated with all visible objects in the scene from a perspective of the camera, and where to calculate whether the view frustum intersects with each of the set of first-level bounding boxes, the at least one processor is configured to: calculate whether each of the set of first-level bounding boxes is visible from the perspective of the camera.

Aspect 14 is the apparatus of any of aspects 1 to 13, where each of the set of first-level bounding boxes is associated with a set of first-level vertices, where the view frustum is associated with a set of frustum vertices, and where to calculate whether the view frustum intersects with each of the set of first-level bounding boxes, the at least one processor is configured to: determine whether each of the set of first-level vertices is within an area corresponding to the set of frustum vertices.

Aspect 15 is the apparatus of aspect 14, where each of the set of first-level vertices is associated with a set of first-level coordinates, where to determine whether each of the set of first-level vertices is within the area corresponding to the set of frustum vertices, the at least one processor is configured to: compare each of the set of first-level coordinates with the area corresponding to the set of frustum vertices.

Aspect 16 is the apparatus of any of aspects 14 to 15, where each of the set of first-level vertices corresponds to a set of first-level planes for each of the set of first-level bounding boxes, where to determine whether each of the set of first-level vertices is within the area corresponding to the set of frustum vertices, the at least one processor is configured to: compare each of the set of first-level planes with the area corresponding to the set of frustum vertices.

Aspect 17 is the apparatus of any of aspects 1 to 16, where the set of first-level child nodes corresponds to a bottom level in the at least one first-level BVH, and where the at least one second-level bounding box that is associated with each of the set of first-level child nodes corresponds to a top level in the plurality of second-level BVHs.

Aspect 18 is the apparatus of any of aspects 1 to 17, where the at least one first-level BVH is a top-level acceleration structure (TLAS) in the BVH structure including the plurality of first-level nodes, and where each of the plurality of second-level BVHs is a bottom-level acceleration structure (BLAS) in the BVH structure including the plurality of second-level nodes, where the set of first-level bounding boxes is a set of first-level axis-aligned bounding boxes (AABBs), where each of the set of second-level bounding boxes is a set of second-level AABBs.

Aspect 19 is the apparatus of any of aspects 1 to 18, where the apparatus is a wireless communication device, further including at least one of an antenna or a transceiver coupled to the at least one processor, where the at least one processor is configured to obtain the indication of the BVH structure including a plurality of nodes via at least one of the antenna or the transceiver.

Aspect 20 is a method of graphics processing for implementing any of aspects 1 to 19.

Aspect 21 is an apparatus for graphics processing including means for implementing any of aspects 1 to 19.

Aspect 22 is a computer-readable medium (e.g., a non-transitory computer-readable medium) storing computer executable code, the code when executed by at least one processor causes the at least one processor to implement any of aspects 1 to 19.

What is claimed is:

1. An apparatus for graphics processing, comprising:
a memory; and
at least one processor coupled to the memory and, based at least in part on information stored in the memory, the at least one processor is configured to:
obtain an indication of a bounding volume hierarchy (BVH) structure including a plurality of nodes, wherein the BVH structure is associated with geometry data for a plurality of primitives in a scene, wherein each of the plurality of nodes is associated with one or more primitives of the plurality of primitives, wherein the BVH structure includes at least one first-level BVH including a plurality of first-level nodes and a plurality of second-level BVHs including a plurality of second-level nodes, wherein the at least one first-level BVH includes a set of first-level bounding boxes associated with the plurality of first-level nodes, wherein each of the plurality of second-level BVHs includes a set of second-level bounding boxes associated with the plurality of second-level nodes, and wherein the BVH structure is associated with a view frustum for a viewpoint of the scene;
calculate whether the view frustum intersects with each of the set of first-level bounding boxes in the at least one first-level BVH, wherein each of the set of first-level bounding boxes is associated with a set of first-level child nodes in the plurality of first-level nodes;
calculate, for each of the set of first-level bounding boxes that the view frustum intersects, whether the view frustum intersects with each of the set of first-level child nodes that is associated with each of the set of first-level bounding boxes, wherein each of the set of first-level child nodes is associated with at least one second-level bounding box in the set of second-level bounding boxes; and
output an indication of all of the set of first-level child nodes that the view frustum intersects for each of the set of first-level bounding boxes that the view frustum intersects.

2. The apparatus of claim 1, wherein the at least one processor is further configured to:
store data associated with all of the set of first-level child nodes that the view frustum intersects for each of the set of first-level bounding boxes that the view frustum intersects based on the calculation of whether the view frustum intersects with each of the set of first-level child nodes.

3. The apparatus of claim 1, wherein all of the plurality of primitives that are associated with all of the set of first-level child nodes that the view frustum intersects are included in a list of primitives for rendering.

4. The apparatus of claim 3, wherein the at least one processor is further configured to:
render, based on the list of primitives for rendering, all of the plurality of primitives that are associated with all of the set of first-level child nodes that the view frustum intersects.

5. The apparatus of claim 3, wherein to output the indication of all of the set of first-level child nodes that the view frustum intersects, the at least one processor is configured to: transmit an indication of the list of primitives for rendering.

6. The apparatus of claim 1, wherein the at least one processor is further configured to:

discard data for at least one of: (1) each of the set of first-level bounding boxes that the view frustum does not intersect, or (2) each of the set of first-level child nodes that the view frustum does not intersect.

7. The apparatus of claim 6, wherein to discard the data for at least one of: (1) each of the set of first-level bounding boxes that the view frustum does not intersect, or (2) each of the set of first-level child nodes that the view frustum does not intersect, the at least one processor is configured to: refrain from including, in a list of primitives for rendering, the data for at least one of: (1) each of the set of first-level bounding boxes that the view frustum does not intersect, or (2) each of the set of first-level child nodes that the view frustum does not intersect.

8. The apparatus of claim 6, wherein to discard the data for at least one of: (1) each of the set of first-level bounding boxes that the view frustum does not intersect, or (2) each of the set of first-level child nodes that the view frustum does not intersect, the at least one processor is configured to: cull the data for at least one of: (1) each of the set of first-level bounding boxes that the view frustum does not intersect, or (2) each of the set of first-level child nodes that the view frustum does not intersect.

9. The apparatus of claim 1, wherein to calculate whether the view frustum intersects with each of the set of first-level bounding boxes, the at least one processor is configured to: calculate a visibility of each of the set of first-level bounding boxes in the scene.

10. The apparatus of claim 1, wherein the at least one processor is further configured to:
determine, for each of the set of first-level child nodes that the view frustum intersects, whether the view frustum intersects with the at least one second-level bounding box that is associated with the first-level child node.

11. The apparatus of claim 10, wherein the at least one processor is further configured to:
store data for the at least one second-level bounding box that is associated with the first-level child node if the view frustum intersects with the at least one second-level bounding box; or
output an indication of the at least one second-level bounding box if the view frustum intersects with the at least one second-level bounding box.

12. The apparatus of claim 10, wherein the at least one processor is further configured to:
discard data for the at least one second-level bounding box that is associated with the first-level child node if the view frustum does not intersect with the at least one second-level bounding box.

13. The apparatus of claim 1, wherein the viewpoint is a camera, wherein the view frustum is associated with all visible objects in the scene from a perspective of the camera, and wherein to calculate whether the view frustum intersects with each of the set of first-level bounding boxes, the at least one processor is configured to: calculate whether each of the set of first-level bounding boxes is visible from the perspective of the camera.

14. The apparatus of claim 1, wherein each of the set of first-level bounding boxes is associated with a set of first-level vertices, wherein the view frustum is associated with a set of frustum vertices, and wherein to calculate whether the view frustum intersects with each of the set of first-level bounding boxes, the at least one processor is configured to: determine whether each of the set of first-level vertices is within an area corresponding to the set of frustum vertices.

15. The apparatus of claim 14, wherein each of the set of first-level vertices is associated with a set of first-level coordinates, wherein to determine whether each of the set of first-level vertices is within the area corresponding to the set of frustum vertices, the at least one processor is configured to: compare each of the set of first-level coordinates with the area corresponding to the set of frustum vertices.

16. The apparatus of claim 14, wherein each of the set of first-level vertices corresponds to a set of first-level planes for each of the set of first-level bounding boxes, wherein to determine whether each of the set of first-level vertices is within the area corresponding to the set of frustum vertices, the at least one processor is configured to: compare each of the set of first-level planes with the area corresponding to the set of frustum vertices.

17. The apparatus of claim 1, wherein the set of first-level child nodes corresponds to a bottom level in the at least one first-level BVH, and wherein the at least one second-level bounding box that is associated with each of the set of first-level child nodes corresponds to a top level in the plurality of second-level BVHs.

18. The apparatus of claim 1, wherein the at least one first-level BVH is a top-level acceleration structure (TLAS) in the BVH structure including the plurality of first-level nodes, and wherein each of the plurality of second-level BVHs is a bottom-level acceleration structure (BLAS) in the BVH structure including the plurality of second-level nodes, wherein the set of first-level bounding boxes is a set of first-level axis-aligned bounding boxes (AABBs), wherein each of the set of second-level bounding boxes is a set of second-level AABBs, and wherein the apparatus is a wireless communication device, further comprising at least one transceiver coupled to the at least one processor, wherein the at least one processor is configured to obtain the indication of the BVH structure via the at least one transceiver.

19. A method of graphics processing, comprising:
obtaining an indication of a bounding volume hierarchy (BVH) structure including a plurality of nodes, wherein the BVH structure is associated with geometry data for a plurality of primitives in a scene, wherein each of the plurality of nodes is associated with one or more primitives of the plurality of primitives, wherein the BVH structure includes at least one first-level BVH including a plurality of first-level nodes and a plurality of second-level BVHs including a plurality of second-level nodes, wherein the at least one first-level BVH includes a set of first-level bounding boxes associated with the plurality of first-level nodes, wherein each of the plurality of second-level BVHs includes a set of second-level bounding boxes associated with the plurality of second-level nodes, and wherein the BVH structure is associated with a view frustum for a viewpoint of the scene;
calculating whether the view frustum intersects with each of the set of first-level bounding boxes in the at least one first-level BVH, wherein each of the set of first-level bounding boxes is associated with a set of first-level child nodes in the plurality of first-level nodes;
calculating, for each of the set of first-level bounding boxes that the view frustum intersects, whether the view frustum intersects with each of the set of first-level child nodes that is associated with each of the set of first-level bounding boxes, wherein each of the set of first-level child nodes is associated with at least one second-level bounding box in the set of second-level bounding boxes; and outputting an indication of all of the set of first-level child nodes that the view frustum intersects for each of the set of first-level bounding boxes that the view frustum intersects.

20. The method of claim 19, further comprising:
storing data associated with all of the set of first-level child nodes that the view frustum intersects for each of the set of first-level bounding boxes that the view frustum intersects based on the calculation of whether the view frustum intersects with each of the set of first-level child nodes.

21. The method of claim 19, wherein all of the plurality of primitives that are associated with all of the set of first-level child nodes that the view frustum intersects are included in a list of primitives for rendering, further comprising:
rendering, based on the list of primitives for rendering, all of the plurality of primitives that are associated with all of the set of first-level child nodes that the view frustum intersects.

22. The method of claim 19, wherein all of the plurality of primitives that are associated with all of the set of first-level child nodes that the view frustum intersects are included in a list of primitives for rendering, wherein outputting the indication of all of the set of first-level child nodes that the view frustum intersects comprises: transmitting an indication of the list of primitives for rendering.

23. The method of claim 19, further comprising:
discarding data for at least one of: (1) each of the set of first-level bounding boxes that the view frustum does not intersect, or (2) each of the set of first-level child nodes that the view frustum does not intersect, wherein discarding the data for at least one of: (1) each of the set of first-level bounding boxes that the view frustum does not intersect, or (2) each of the set of first-level child nodes that the view frustum does not intersect comprises: refraining from including, in a list of primitives for rendering, the data for at least one of: (1) each of the set of first-level bounding boxes that the view frustum does not intersect, or (2) each of the set of first-level child nodes that the view frustum does not intersect.

24. The method of claim 19, discarding data for at least one of: (1) each of the set of first-level bounding boxes that the view frustum does not intersect, or (2) each of the set of first-level child nodes that the view frustum does not intersect, wherein discarding the data for at least one of: (1) each of the set of first-level bounding boxes that the view frustum does not intersect, or (2) each of the set of first-level child nodes that the view frustum does not intersect comprises: culling the data for at least one of: (1) each of the set of first-level bounding boxes that the view frustum does not intersect, or (2) each of the set of first-level child nodes that the view frustum does not intersect.

25. The method of claim 19, further comprising:
determining, for each of the set of first-level child nodes that the view frustum intersects, whether the view frustum intersects with the at least one second-level bounding box that is associated with the first-level child node;
storing data for the at least one second-level bounding box that is associated with the first-level child node if the view frustum intersects with the at least one second-level bounding box; or
outputting an indication of the at least one second-level bounding box if the view frustum intersects with the at least one second-level bounding box.

26. The method of claim 19, further comprising:
determining, for each of the set of first-level child nodes that the view frustum intersects, whether the view frustum intersects with the at least one second-level bounding box that is associated with the first-level child node; and
discarding data for the at least one second-level bounding box that is associated with the first-level child node if the view frustum does not intersect with the at least one second-level bounding box.

27. The method of claim 19, wherein calculating whether the view frustum intersects with each of the set of first-level bounding boxes comprises: calculating a visibility of each of the set of first-level bounding boxes in the scene, wherein the viewpoint is a camera, wherein the view frustum is associated with all visible objects in the scene from a perspective of the camera, and wherein calculating whether the view frustum intersects with each of the set of first-level bounding boxes comprises: calculating whether each of the set of first-level bounding boxes is visible from the perspective of the camera.

28. The method of claim 19, wherein each of the set of first-level bounding boxes is associated with a set of first-level vertices, wherein the view frustum is associated with a set of frustum vertices, and wherein calculating whether the view frustum intersects with each of the set of first-level bounding boxes comprises: determining whether each of the set of first-level vertices is within an area corresponding to the set of frustum vertices;
wherein each of the set of first-level vertices is associated with a set of first-level coordinates, wherein determining whether each of the set of first-level vertices is within the area corresponding to the set of frustum vertices comprises: comparing each of the set of first-level coordinates with the area corresponding to the set of frustum vertices; or
wherein each of the set of first-level vertices corresponds to a set of first-level planes for each of the set of first-level bounding boxes, wherein determining whether each of the set of first-level vertices is within the area corresponding to the set of frustum vertices comprises: comparing each of the set of first-level planes with the area corresponding to the set of frustum vertices.

29. An apparatus for graphics processing, comprising:
means for obtaining an indication of a bounding volume hierarchy (BVH) structure including a plurality of nodes, wherein the BVH structure is associated with geometry data for a plurality of primitives in a scene, wherein each of the plurality of nodes is associated with one or more primitives of the plurality of primitives, wherein the BVH structure includes at least one first-level BVH including a plurality of first-level nodes and a plurality of second-level BVHs including a plurality of second-level nodes, wherein the at least one first-level BVH includes a set of first-level bounding boxes associated with the plurality of first-level nodes, wherein each of the plurality of second-level BVHs includes a set of second-level bounding boxes associated with the plurality of second-level nodes, and wherein the BVH structure is associated with a view frustum for a viewpoint of the scene;
means for calculating whether the view frustum intersects with each of the set of first-level bounding boxes in the at least one first-level BVH, wherein each of the set of first-level bounding boxes is associated with a set of first-level child nodes in the plurality of first-level nodes;

means for calculating, for each of the set of first-level bounding boxes that the view frustum intersects, whether the view frustum intersects with each of the set of first-level child nodes that is associated with each of the set of first-level bounding boxes, wherein each of the set of first-level child nodes is associated with at least one second-level bounding box in the set of second-level bounding boxes; and means for outputting an indication of all of the set of first-level child nodes that the view frustum intersects for each of the set of first-level bounding boxes that the view frustum intersects.

* * * * *